United States Patent
Nose et al.

(10) Patent No.: US 11,214,243 B2
(45) Date of Patent: Jan. 4, 2022

(54) VEHICLE AND CONTROL METHOD THEREOF

(71) Applicant: TOYOTA JIDOSHA KABUSHIKI KAISHA, Aichi-ken (JP)

(72) Inventors: Yuki Nose, Kasugai (JP); Masaaki Kobayashi, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/029,043

(22) Filed: Sep. 23, 2020

(65) Prior Publication Data

US 2021/0107452 A1    Apr. 15, 2021

(30) Foreign Application Priority Data

Oct. 9, 2019 (JP) .............................. JP2019-186130

(51) Int. Cl.
  *B60L 1/00* (2006.01)
  *B60W 20/40* (2016.01)
  *B60W 20/16* (2016.01)
  *F01N 11/00* (2006.01)

(52) U.S. Cl.
  CPC ............ *B60W 20/40* (2013.01); *B60W 20/16* (2016.01); *F01N 11/002* (2013.01); *B60W 2510/068* (2013.01)

(58) Field of Classification Search
  CPC .... F01N 3/0814; F01N 3/0842; F01N 3/0871; F01N 2570/14; F01N 2900/1404; F01N 2900/1626; F02D 41/0275
  See application file for complete search history.

(56) References Cited

U.S. PATENT DOCUMENTS

| | | |
|---|---|---|
| 5,540,633 A | 7/1996 | Yamanaka et al. |
| 5,630,480 A | 5/1997 | Nishikata |
| 5,845,492 A | 12/1998 | Isobe et al. |
| 2011/0072787 A1 | 3/2011 | Fubbard et al. |
| 2015/0136082 A1 | 5/2015 | Younkins et al. |
| 2017/0305411 A1 | 10/2017 | Leone et al. |
| 2018/0106206 A1 | 4/2018 | Tsunoda et al. |

FOREIGN PATENT DOCUMENTS

| | | |
|---|---|---|
| CN | 102032026 B | 5/2015 |
| DE | 112016005174 T5 | 7/2018 |
| JP | H783082 A | 3/1995 |
| JP | 200327996 A | 1/2003 |
| JP | 2004218541 A | 8/2004 |
| JP | 200882292 A | 4/2008 |

(Continued)

*Primary Examiner* — John Kwon
(74) *Attorney, Agent, or Firm* — Hauptman Ham, LLP

(57) ABSTRACT

A vehicle includes: a motive power generating device that includes a multi-cylinder engine and outputs driving power to a wheel; an exhaust gas control apparatus including a catalyst that removes harmful components of exhaust gas from the multi-cylinder engine; and a controller. The controller is configured to, upon request for raising the temperature of the catalyst during load operation of the multi-cylinder engine, execute catalyst temperature raising control that involves stopping fuel supply to at least one of cylinders and supplying fuel to the other cylinders than the at least one cylinder, and to control the motive power generating device so as to cover a driving power shortage resulting from execution of the catalyst temperature raising control.

11 Claims, 13 Drawing Sheets

(56) References Cited

FOREIGN PATENT DOCUMENTS

| | | |
|---|---|---|
| JP | 200935117 A | 2/2009 |
| JP | 2009248698 A | 10/2009 |
| JP | 201169281 A | 4/2011 |
| WO | 2007016713 A2 | 2/2007 |
| WO | 2017083389 A1 | 5/2017 |

VEHICLE AND CONTROL METHOD THEREOF

INCORPORATION BY REFERENCE

The disclosure of Japanese Patent Application No. 2019-186130 filed on Oct. 9, 2019 including the specification, drawings and abstract is incorporated herein by reference in its entirety.

BACKGROUND

1. Technical Field

This disclosure relates to a vehicle including a multi-cylinder engine and an exhaust gas control apparatus having a catalyst that removes harmful components of exhaust gas from the multi-cylinder engine, and to a control method of this vehicle.

2. Description of Related Art

There is a hitherto known controller that, when an SOx-poisoning amount of a catalytic device disposed in an exhaust passage of an internal combustion engine exceeds a predetermined value, executes catalyst temperature raising control (dither control) involving setting air-fuel ratios for some of the cylinders (rich cylinders) to rich ratios while setting air-fuel ratios for other cylinders (lean cylinders) to lean ratios (see, e.g., Japanese Patent Application Publication No. 2004-218541). This controller sets each of the degree of richness for the rich cylinders and the degree of leanness for the lean cylinders to a different degree at an initiation stage of the temperature raising control and at a later stage. Further, this controller changes the degree of richness and the degree of leanness as time passes from the start of the temperature raising control such that the degree of richness and the degree of leanness become lower at the initiation stage of the temperature raising control. This makes it possible to raise the temperature of the catalytic device while reducing the likelihood of misfiring in the lean cylinders.

There is another hitherto known controller that sequentially executes ignition timing retarding control, fuel-cutoff-and-rich-burn control, and lean-burn-and-rich-burn control (dither control) as catalyst temperature raising control for warming up a catalytic device that removes harmful components of exhaust gas from an internal combustion engine (see, e.g., Japanese Patent Application Publication No. 2011-069281). The ignition timing retarding control involves retarding the ignition timing to warm up the catalytic device with high-temperature exhaust gas. The fuel-cutoff-and-rich-burn control involves making a cylinder to which fuel injection is stopped with an intake valve and an exhaust valve kept operating and a cylinder into which fuel is injected so as to enrich the air-fuel ratio alternate with each other. The fuel-cutoff-and-rich-burn control is executed for about three seconds when the temperature at a catalyst inlet reaches a first temperature as a result of the ignition timing retarding control. Thus, oxygen and uncombusted gas are sent to the catalytic device, and the catalytic device is warmed up with the heat of an oxidation reaction. When the temperature at the catalyst inlet reaches a second temperature higher than the first temperature, the lean-burn-and-rich-burn control is executed until the temperature at a catalyst outlet reaches the second temperature.

Among hitherto known controllers of a hybrid vehicle including an internal combustion engine and an electric motor, there is one that stops fuel supply to each cylinder of the internal combustion engine when power required of the internal combustion engine becomes smaller than a threshold value, and controls the electric motor so as to output a torque based on a required torque and a correction torque at a timing when a correction start time has elapsed from the start of fuel cutoff. This controller estimates, based on the speed and the number of the cylinders of the internal combustion engine, a shortest time and a longest time from the start of fuel cutoff until a torque shock due to the fuel cutoff starts to occur, and sets a time between the shortest time and the longest time as the correction start time. The correction torque is determined so as to offset the torque shock acting on a drive shaft.

SUMMARY

Executing these conventional methods of catalyst temperature raising control cannot always send sufficient air, i.e., oxygen to a catalytic device and sufficiently raise the temperature of the catalytic device, if the environmental temperature is low or the temperature required to be achieved by catalyst temperature raising control is high. Moreover, it is not easy to introduce the amount of oxygen required to regenerate a catalyst or a particulate filter of an exhaust gas control apparatus into the exhaust gas control apparatus by these conventional methods of catalyst temperature raising control. When executing catalyst temperature raising control during load operation of an internal combustion engine, it is necessary to avoid deteriorating the drivability of the vehicle equipped with the internal combustion engine.

The disclosure disclosed herein can, during load operation of a multi-cylinder engine, sufficiently raise the temperature of a catalyst of an exhaust gas control apparatus and supply a sufficient amount of oxygen to the exhaust gas control apparatus while avoiding deteriorating the drivability of the vehicle.

A vehicle according to a first aspect of this disclosure includes: a motive power generating device that includes a multi-cylinder engine and outputs driving power to a wheel; an exhaust gas control apparatus including a catalyst that removes harmful components of exhaust gas from the multi-cylinder engine; and a controller. The controller is configured to, upon request for raising the temperature of the catalyst during load operation of the multi-cylinder engine, execute catalyst temperature raising control that involves stopping fuel supply to at least one of cylinders and supplying fuel to the other cylinders than the at least one cylinder, and to control the motive power generating device so as to cover a driving power shortage resulting from execution of the catalyst temperature raising control.

In a control method of a vehicle according to a second aspect of this disclosure, the vehicle includes a motive power generating device that includes a multi-cylinder engine and outputs driving power to a wheel, and an exhaust gas control apparatus including a catalyst that removes harmful components of exhaust gas from the multi-cylinder engine. The method includes, upon request for raising the temperature of the catalyst during load operation of the multi-cylinder engine, executing catalyst temperature raising control that involves stopping fuel supply to at least one of cylinders and supplying fuel to the other cylinders than the at least one cylinder, and controlling the motive power generating device so as to cover a driving power shortage resulting from execution of the catalyst temperature raising control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Next, a mode for carrying out the disclosure will be described with reference to the drawings.

Figure 1:
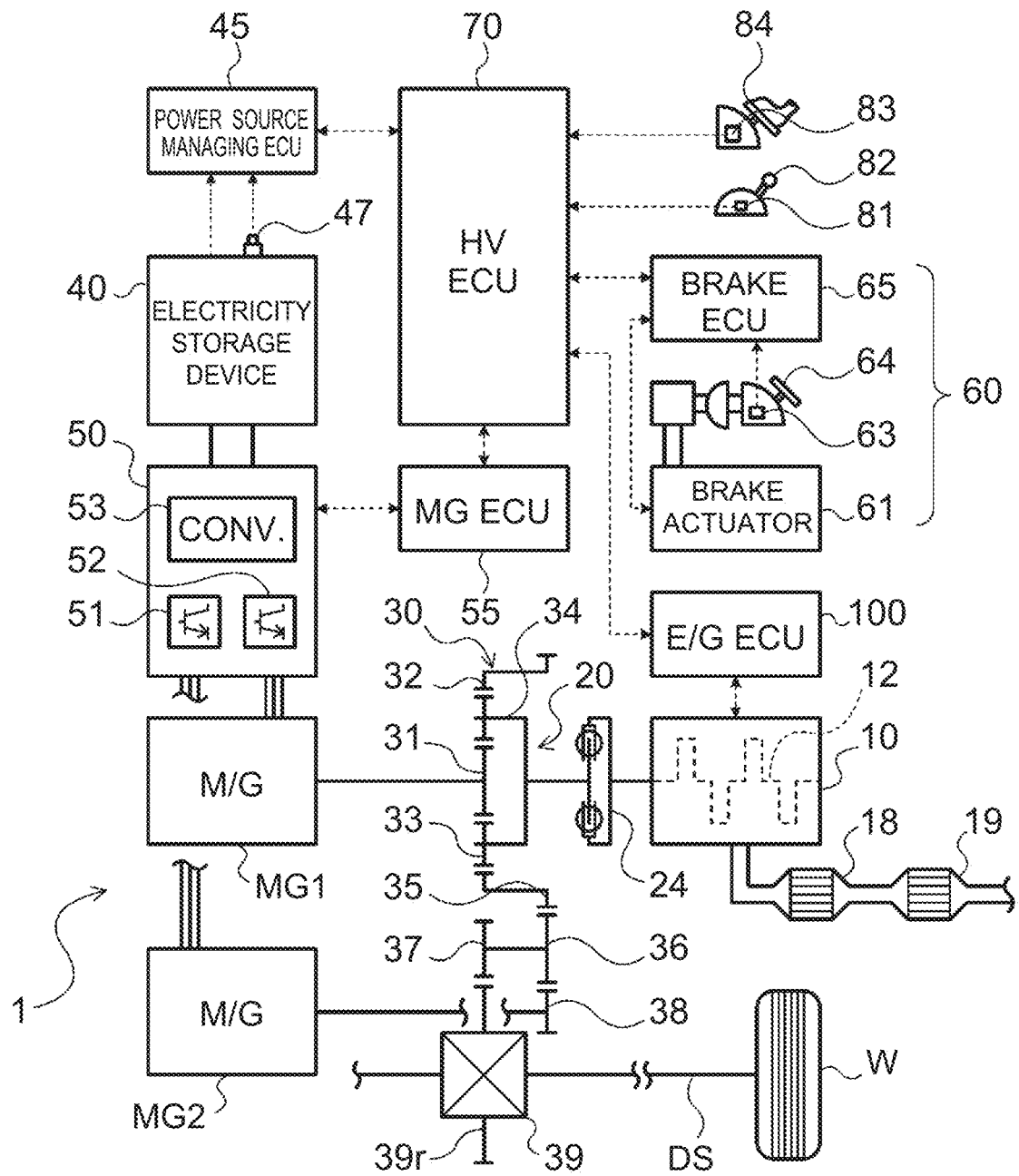
FIG. 1 is a schematic configuration diagram showing a vehicle of this disclosure.

FIG. 1 is a schematic configuration diagram showing a hybrid vehicle 1 that is a vehicle of this disclosure. The hybrid vehicle 1 shown in FIG. 1 includes: a multi-cylinder engine (hereinafter referred to simply as an "engine") 10 having a plurality of (in this embodiment, e.g., four) cylinders (combustion chambers) 11; a single-pinion planetary gear 30; motor generators MG1, MG2 that are both synchronous generator-motors (three-phase alternating-current electric motors); an electricity storage device (battery) 40; a power control unit (hereinafter referred to as a "PCU") 50 that is connected to the electricity storage device 40 and drives the motor generators MG1, MG2; an electronically controlled hydraulic braking device 60 that can apply a frictional braking force to a wheel W; and a hybrid electronic control unit (hereinafter referred to as an "HVECU") 70 that controls the entire vehicle.

Figure 2:
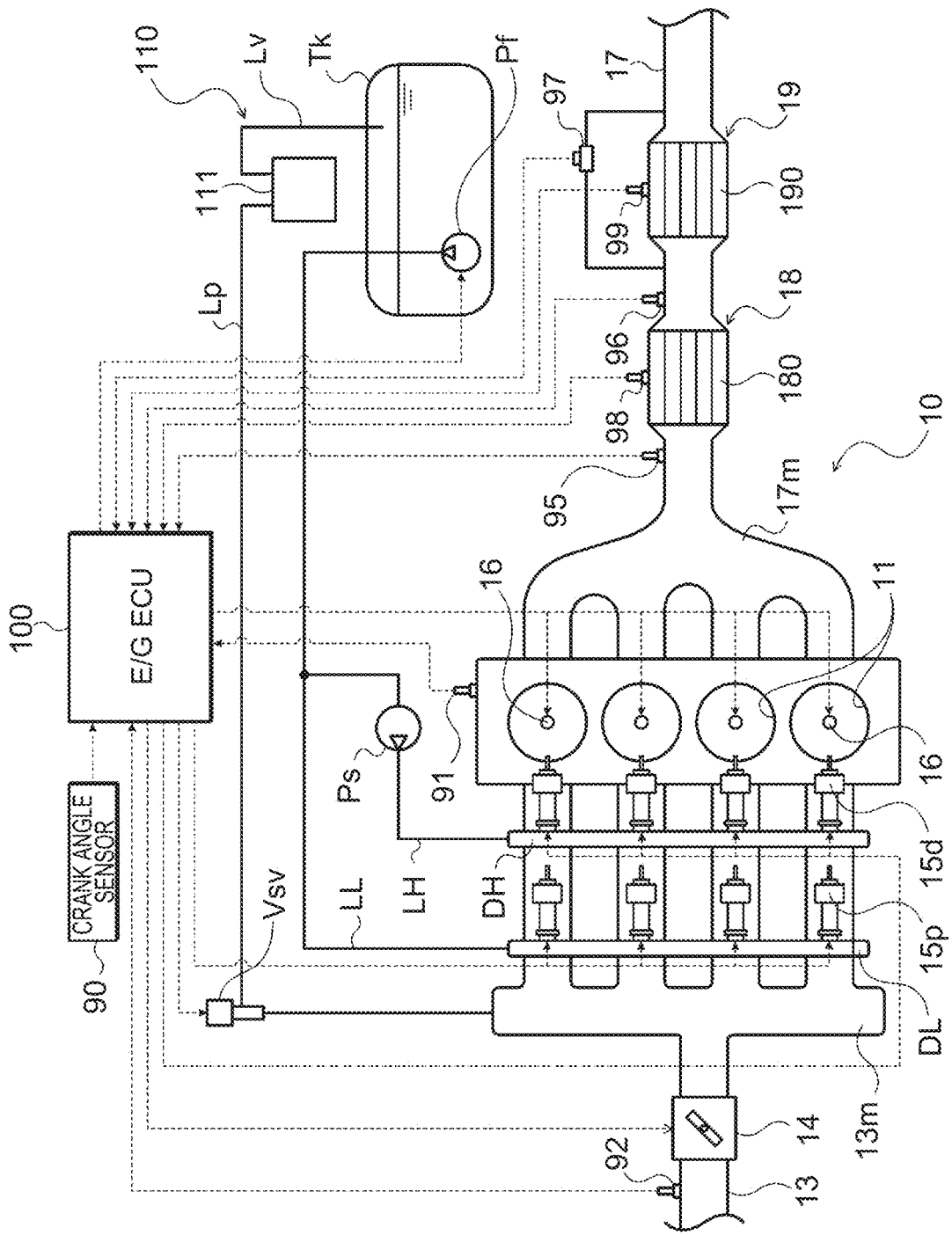
FIG. 2 is a schematic configuration diagram showing a multi-cylinder engine included in the vehicle of FIG. 1.

The engine 10 is an in-line gasoline engine (internal combustion engine) that converts reciprocating motion of pistons (not shown) accompanying combustion of a mixture of hydrocarbon fuel and air in the cylinders 11 into rotating motion of a crankshaft (output shaft) 12. As shown in FIG. 2, the engine 10 includes an intake pipe 13, an intake manifold 13$m$, a throttle valve 14, a plurality of intake valves and a plurality of exhaust valves (neither is shown), a plurality of port injection valves 15$p$, a plurality of cylinder injection valves 15$d$, a plurality of spark plugs 16, an exhaust manifold 17$m$, and an exhaust pipe 17. The throttle valve 14 is an electronically controlled throttle valve that can change the area of passage inside the intake pipe 13. The intake manifold 13$m$ is connected to the intake pipe 13 and an intake port of each cylinder 11. Each port injection valve 15$p$ injects fuel into the corresponding intake port, and each cylinder injection valve 15$d$ injects fuel directly into the corresponding cylinder 11. The exhaust manifold 17$m$ is connected to an exhaust port of each cylinder 11 and the exhaust pipe 17.

The engine 10 includes a low-pressure delivery pipe DL that is connected to a feed pump (low-pressure pump) Pf through a low-pressure fuel supply pipe LL, and a high-pressure delivery pipe DH that is connected to a supply pump (high-pressure pump) Ps through a high-pressure fuel supply pipe LH. The low-pressure delivery pipe DL is connected to a fuel inlet of each port injection valve 15$p$, and the high-pressure delivery pipe DH is connected to a fuel inlet of each cylinder injection valve 15$d$. The feed pump Pf is an electrically powered pump including a motor that is driven with electricity from an auxiliary battery (not shown). Fuel from the feed pump Pf is stored in the low-pressure delivery pipe DL and supplied from the low-pressure delivery pipe DL to each port injection valve 15$p$. The supply pump Ps is, for example, a piston pump (mechanical pump) driven by the engine 10. High-pressure fuel from the supply pump Ps is stored inside the high-pressure delivery pipe DH and supplied from the high-pressure delivery pipe DH to each cylinder injection valve 15$d$.

As shown in FIG. 2, the engine 10 further includes an evaporated fuel processing device 110 that introduces, into the intake manifold 13$m$, evaporated fuel that is generated inside a fuel tank Tk holding fuel. The evaporated fuel processing device 110 includes a canister 111 containing an adsorbent (active carbon) that adsorbs evaporated fuel inside the fuel tank Tk, a vapor passage Lv connecting the fuel tank Tk and the canister 111 to each other, a purge passage Lp connecting the canister 111 and the intake manifold 13$m$ to each other, and a purge valve (vacuum switching valve) Vsv installed in the purge passage Lp. In this embodiment, the purge valve Vsv is a control valve of which the opening degree is adjustable.

The engine 10 further includes, as exhaust gas control apparatuses, an upstream control apparatus 18 and a downstream control apparatus 19 that are both incorporated in the exhaust pipe 17. The upstream control apparatus 18 includes an NOx-storing exhaust gas control catalyst (three-way catalyst) 180 that removes harmful components, such as CO (carbon monoxide), HC, and NOx, of exhaust gas from each cylinder 11 of the engine 10. The downstream control apparatus 19 includes a particulate filter (GPF) 190 that is disposed downstream of the upstream control apparatus 18 and collects particulate matter (fine particles) in the exhaust gas. In this embodiment, the particulate filter 190 is a filter that supports an NOx-storing exhaust gas control catalyst (three-way catalyst).

The engine 10 is controlled by an engine electronic control unit (hereinafter referred to as an "engine ECU") 100. The engine ECU 100 includes a microcomputer having a CPU, ROM, RAM, input-output interface, etc., various driving circuits, and various logic ICs (none is shown), and executes intake air amount control, fuel injection control, and ignition timing control over the engine 10, purge control for controlling the amount of evaporated fuel purged by the evaporated fuel processing device 110 (purge valve Vsv), etc. The engine ECU 100 acquires, through an input port (not shown), detection values of a crank angle sensor 90, a coolant temperature sensor 91, an air flowmeter 92, an intake air pressure sensor (not shown), a throttle valve position sensor (not shown), an upstream air-fuel ratio sensor 95, a downstream air-fuel ratio sensor 96, a differential pressure sensor 97, an upstream catalyst temperature sensor 98, a downstream catalyst temperature sensor 99, etc.

The crank angle sensor 90 detects a rotation position of the crankshaft 12 (crank position). The coolant temperature sensor 91 detects a coolant temperature Tw of the engine 10. The air flowmeter 92 detects an intake air amount GA of the engine 10. The intake air pressure sensor detects a pressure inside the intake pipe 13, i.e., an intake air pressure. The throttle valve position sensor detects the position of a valve disc of the throttle valve 14 (throttle position). The upstream air-fuel ratio sensor 95 detects an upstream air-fuel ratio AFf that is an air-fuel ratio of exhaust gas flowing into the upstream control apparatus 18. The downstream air-fuel ratio sensor 96 detects a downstream air-fuel ratio AFr that is an air-fuel ratio of exhaust gas flowing into the downstream control apparatus 19. The differential pressure sensor 97 detects a differential pressure ΔP between an upstream side and a downstream side of the downstream control apparatus 19, i.e., the particulate filter 190. The upstream catalyst temperature sensor 98 detects a temperature (catalyst temperature) Tct of the upstream control apparatus 18, i.e., the exhaust gas control catalyst 180. The downstream catalyst temperature sensor 99 detects a temperature (catalyst temperature) Tpf of the downstream control apparatus 19, i.e., the particulate filter 190.

The engine ECU 100 calculates a speed Ne of the engine 10 (crankshaft 12) based on the crank position from the crank angle sensor 90. Further, the engine ECU 100 calculates (estimates) a build-up amount Dpm of particulate matter on the particulate filter 190 of the downstream control apparatus 19 at predetermined time intervals by either a driving history method or a differential pressure method according to a driving state of the engine 10 etc. When using the differential pressure method, the engine ECU 100 calculates the build-up amount Dpm based on the differential pressure ΔP detected by the differential pressure sensor 97, i.e., a pressure loss at the particulate filter 190 due to building up of particulate matter. When using the driving history method, the engine ECU 100 calculates the build-up amount Dpm (current value) by adding an estimated increase amount (positive value) or an estimated decrease amount (negative value) of particulate matter to the last value of the build-up amount Dpm according to the driving state of the engine 10. The estimated increase amount of particulate matter is calculated, for example, as the product of an estimated amount of particulate matter emitted that is calculated from the speed Ne, a load factor, and the coolant temperature Tw of the engine 10; an emission factor; and the collection efficiency of the particulate filter 190. The estimated decrease amount of particulate matter is calculated, for example, as the product of an amount of particulate matter combusted that is calculated from the last value of the build-up amount Dpm, a flow rate of inflow air, and the temperature Tpf of the particulate filter 190; and a correction factor.

The engine 10 may be a diesel engine having a diesel particulate filter (DPF) or an LPG engine. The temperatures Tct, Tpf of the exhaust gas control catalyst 180 and the particulate filter 190 may be estimated based on the intake air amount GA, the speed Ne, the temperature of exhaust gas, the upstream air-fuel ratio AFf, the downstream air-fuel ratio AFr, etc.

The planetary gear 30 is a differential rotating mechanism including a sun gear (first element) 31, a ring gear (second element) 32, and a planetary carrier (third element) 34 that rotatably supports a plurality of pinion gears 33. As shown in FIG. 1, the sun gear 31 is coupled to a rotor of the motor generator MG1, and the planetary carrier 34 is coupled to the crankshaft 12 of the engine 10 through a damper mechanism 24. The ring gear 32 is integrated with a counter drive gear 35 acting as an output member, and these gears rotate coaxially and integrally.

The counter drive gear 35 is coupled to left and right wheels (driving wheels) W through a counter driven gear 36 meshing with the counter drive gear 35, a final drive gear (drive pinion gear) 37 rotating integrally with the counter driven gear 36, a final driven gear (differential ring gear) 39r meshing with the final drive gear 37, a differential gear 39, and a drive shaft DS. Thus, the planetary gear 30, the gear train from the counter drive gear 35 to the final driven gear 39r, and the differential gear 39 constitute a transaxle 20 that transmits part of an output torque of the engine 10 acting as a motive power generation source to the wheels W and couples together the engine 10 and the motor generator MG1.

The drive gear 38 is fixed to a rotor of the motor generator MG2. The drive gear 38 has fewer teeth than the counter driven gear 36 and meshes with the counter driven gear 36. Thus, the motor generator MG2 is coupled to the left and right wheels W through the drive gear 38, the counter driven gear 36, the final drive gear 37, the final driven gear 39r, the differential gear 39, and the drive shaft DS.

The motor generator MG1 (second electric motor) operates mainly as a power generator that converts at least part of power from the engine 10 in load operation into electricity. The motor generator MG2 operates mainly as an electric motor that is driven with at least one of electricity from the electricity storage device 40 and electricity from the motor generator MG1 and generates a driving torque to the drive shaft DS. Thus, in the hybrid vehicle 1, the motor generator MG2 as a motive power generation source functions as a motive power generating device that, together with the engine 10, outputs a driving torque (driving power) to the wheels W mounted on the drive shaft DS. Further, the motor generator MG2 outputs a regenerative braking torque to brake the hybrid vehicle 1. The motor generators MG1, MG2 can exchange electricity with the electricity storage device 40 through the PCU 50 and also exchange electricity with each other through the PCU 50.

The electricity storage device 40 is, for example, a lithium-ion secondary battery or a nickel-metal hydride secondary battery. The electricity storage device 40 is managed by a power source managing electronic control unit (hereinafter referred to as a "power source managing ECU") 45 including a microcomputer having a CPU, ROM, RAM, input-output interface, etc. (none is shown). The power source managing ECU 45 derives a state-of-charge (SOC), allowable charge electricity Win, allowable discharge electricity Wout, etc. of the electricity storage device 40 based on a voltage VB between terminals from a voltage sensor of the electricity storage device 40, a charge-discharge current IB from a current sensor thereof, a battery temperature Tb from a temperature sensor 47 thereof (see FIG. 1), etc.

The PCU 50 includes a first inverter 51 that drives the motor generator MG1, a second inverter 52 that drives the motor generator MG2, and a boost converter (voltage conversion module) 53 that can step up the voltage of electricity from the electricity storage device 40 and step down the voltage of electricity from the motor generators MG1, MG2. The PCU 50 is controlled by a motor electronic control unit (hereinafter referred to as an "MGECU") 55 including a microcomputer having a CPU, ROM, RAM, input-output interface, etc., various driving circuits, and various logic ICs (none is shown). The MGECU 55 acquires a command signal from the HVECU 70, voltages before and after being stepped up by the boost converter 53, detection values of resolvers that detect the rotation positions of the rotors of the motor generators MG1, MG2, phase currents applied to the motor generators MG1, MG2, etc. Based on these signals etc., the MGECU 55 controls switching of the first and second inverters 51, 52 and the boost converter 53. Based on the detection values of the resolvers, the MGECU 55 calculates rotation speeds Nm1, Nm2 of the rotors of the motor generators MG1, MG2.

The hydraulic braking device 60 includes: a master cylinder; a plurality of brake pads (not shown) that holds therebetween a brake disc mounted on each wheel W and applies a braking torque (frictional braking torque) to the corresponding wheel; a plurality of wheel cylinders (not shown) that drives the corresponding brake pad; a hydraulic brake actuator 61 that supplies hydraulic pressure to each wheel cylinder; and a brake electronic control unit (hereinafter referred to as a "brake ECU") 65 that controls the brake actuator 61. The brake ECU 65 includes a microcomputer having a CPU, ROM, RAM, input-output interface, etc. (none is shown). The brake ECU 65 acquires a command signal from the HVECU 70, a brake pedal stroke BS (an amount of pressing on a brake pedal 64) detected by the brake pedal stroke sensor 63, a vehicle speed V detected by a vehicle speed sensor (not shown), etc. The brake ECU 65 controls the brake actuator 61 based on these signals etc.

The HVECU 70 includes a microcomputer having a CPU, ROM, RAM, input-output interface, etc., various driving circuits, and various logic ICs (none is shown). The HVECU 70 exchanges information (communication frames) with the ECUs 100, 45, 55, 65, etc. through a common communication line (multiplex communication bus; not shown) that is a CAN bus including two Lo and Hi communication lines (wire harnesses). The HVECU 70 is separately connected to each of the ECUs 100, 45, 55, 65 through a dedicated communication line (local communication bus) that is a CAN bus including Lo and Hi two communication lines (wire harnesses). The HVECU 70 exchanges information (communication frames) separately with each of the ECUs 100, 45, 55, 65 through the corresponding dedicated communication line. Further, the HVECU 70 acquires signals from a start switch (not shown) that orders system start of the hybrid vehicle 1, a shift position SP of a shift lever 82 detected by a shift position sensor 81, an accelerator operation amount Acc (an amount of pressing on an accelerator pedal 84) detected by an accelerator pedal position sensor 83, the vehicle speed V detected by the vehicle speed sensor (not shown), the crank position detected by the crank angle sensor 90 of the engine 10, etc. Further, the HVECU 70 acquires the state-of-charge (SOC), the allowable charge electricity Win, and the allowable discharge electricity Wout of the electricity storage device 40 from the power source managing ECU 45, the rotation speeds Nm1, Nm2 of the motor generators MG1, MG2 from the MGECU 55, etc.

When the hybrid vehicle 1 travels, the HVECU 70 derives, from a required torque setting map (not shown), a required torque Tr* (including a required braking torque) to be output to the drive shaft DS corresponding to the accelerator operation amount Acc and the vehicle speed V. Based on the required torque Tr* and a rotating speed Nds of the drive shaft DS, the HVECU 70 sets required travel power Pd* (=Tr*×Nds) required for the hybrid vehicle 1 to travel. Based on the required torque Tr*, the required travel power Pd*, separately set target charge-discharge electricity Pb* and the allowable discharge electricity Wout of the electricity storage device 40, etc., the HVECU 70 determines whether or not to perform load operation of the engine 10.

When performing load operation of the engine 10, the HVECU 70 sets required power Pe* (=Pd*−Pb*+Loss) of the engine 10 based on the required travel power Pd*, the target charge-discharge electricity Pb*, etc. Further, the HVECU 70 sets a target speed Ne* of the engine 10 according to the required power Pe* such that the engine 10 is efficiently operated and does not fall below a lower limit speed Nelim according to the driving state of the hybrid vehicle 1 etc. Then, the HVECU 70 sets, within the ranges of the allowable charge electricity Win and the allowable discharge electricity Wout of the electricity storage device 40, torque commands Tm1*, Tm2* for the motor generators MG1, MG2 according to the required torque Tr*, the target speed Ne*, etc. On the other hand, when stopping the operation of the engine 10, the HVECU 70 sets the required power Pe*, the target speed Ne*, and the torque command Tm1* to zero. Further, the HVECU 70 sets the torque command Tm2* within the ranges of the allowable charge electricity Win and the allowable discharge electricity Wout of the electricity storage device 40 such that a torque according to the required torque Tr* is output from the motor generator MG2 to the drive shaft DS.

Then, the HVECU 70 sends the required power Pe* and the target speed Ne* to the engine ECU 100 and sends the torque commands Tm1*, Tm2* to the MGECU 55. Based on the required power Pe* and the target speed Ne*, the engine ECU 100 executes intake air amount control, fuel injection control, ignition timing control, etc. In this embodiment, the engine ECU 100 basically executes the fuel injection control such that the air-fuel ratio for each cylinder 11 of the engine 10 becomes the stoichiometric air-fuel ratio (=14.6 to 14.7). When the load on (the required power Pe* of) the engine 10 is equal to or smaller than a predetermined value, fuel is injected from each port injection valve 15p, and fuel injection from each cylinder injection valve 15d is stopped. While the load on the engine 10 exceeds the predetermined value, fuel injection from each port injection valve 15p is stopped and fuel is injected from each cylinder injection valve 15d. In this embodiment, fuel injection and ignition of the cylinders 11 are executed in the (ignition) order of a first cylinder #1, a third cylinder #3, a fourth cylinder #4, and a second cylinder #2.

The MGECU 55 controls switching of the first and second inverters 51, 52 and the boost converter 53 based on the torque commands Tm1*, Tm2*. When the engine 10 performs load operation, the motor generators MG1, MG2 are controlled so as to convert, together with the planetary gear 30, part of power output from the engine 10 (when the electricity storage device 40 is being charged) or the whole of the power (when the electricity storage device 40 is being discharged) into a torque and output this torque to the drive shaft DS. Thus, the hybrid vehicle 1 travels on power from the engine 10 (a directly transmitted torque) and power from the motor generator MG2 (HV travel). On the other hand, when the engine 10 stops operating, the hybrid vehicle 1 travels only on power (a driving torque) from the motor generator MG2 (EV travel).

Here, as described above, the hybrid vehicle 1 of this embodiment includes the downstream control apparatus 19 having the particulate filter 190 as the exhaust gas control apparatus. The build-up amount Dpm of particulate matter on the particulate filter 190 increases as the distance traveled by the hybrid vehicle 1 increases and as the environmental temperature becomes lower. Therefore, at a stage where the build-up amount Dpm of particulate matter on the particulate filter 190 has increased, the hybrid vehicle 1 needs to combust the particulate matter and regenerate the particulate filter 190 by sending a large amount of air, i.e., oxygen to the particulate filter 190 of which the temperature has been sufficiently raised. To do so, the engine ECU 100 of the hybrid vehicle 1 executes a routine of determining whether or not the particulate filter needs to be regenerated, illustrated in FIG. 3, at predetermined time intervals when load operation of the engine 10 is performed according to a driver of the hybrid vehicle 1 pressing on the accelerator pedal 84.

Figure 3:
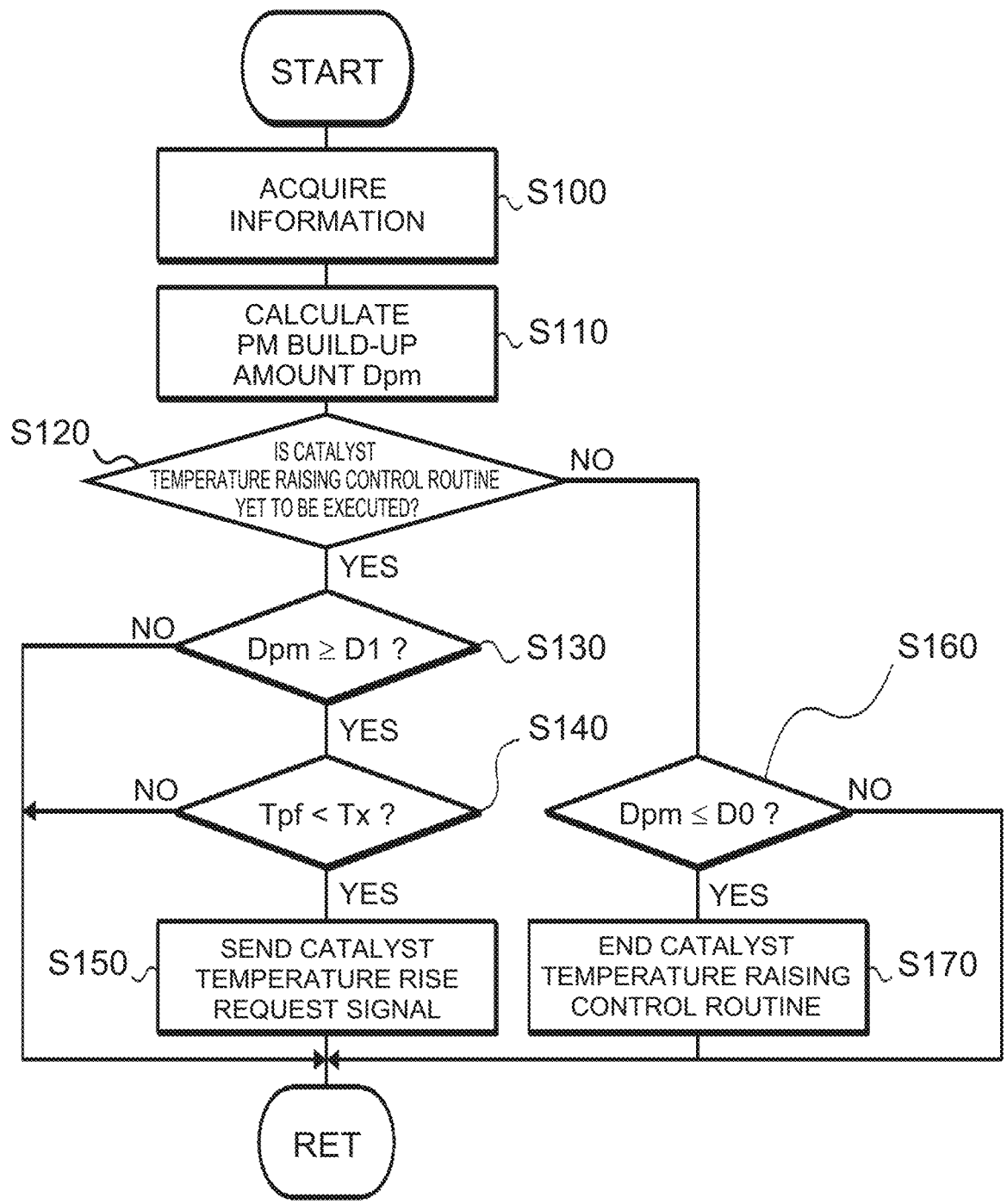
FIG. 3 is a flowchart illustrating a routine of determining whether or not a particulate filter needs to be regenerated that is executed in the vehicle of FIG. 1.

At the start of the routine of FIG. 3, the engine ECU 100 acquires information required for the determination, such as the intake air amount GA, the speed Ne, and the coolant temperature Tw of the engine 10, and the temperature Tpf of the particulate filter 190 (step S100). Based on the physical quantities etc. acquired in step S100, the engine ECU 100 calculates the build-up amount Dpm of particulate matter on the particulate filter 190 by either the driving history method or the differential pressure method according to the operating state of the engine 10 etc. (step S110). Then, the engine ECU 100 determines whether or not a catalyst temperature raising control routine for raising the temperatures of the exhaust gas control catalyst 180 of the upstream control apparatus 18 and the particulate filter 190 of the downstream control apparatus 19 is yet to be executed (step S120).

When it is determined in step S120 that the catalyst temperature raising control routine is yet to be executed (step S120: YES), the engine ECU 100 determines whether or not the build-up amount Dpm calculated in step S110 is equal to or larger than a predetermined threshold value D1 (e.g., a value of about 5000 mg) (step S130). When it is determined in step S130 that the build-up amount Dpm is smaller than the threshold value D1 (step S130: NO), the engine ECU 100 ends the routine of FIG. 3 at that point for now. When it is determined in step S130 that the build-up amount Dpm is equal to or larger than the threshold value D1 (step S130: YES), the engine ECU 100 determines whether or not the temperature Tpf of the particulate filter 190 acquired in step S100 is lower than a predetermined temperature raising control start temperature (predetermined temperature) Tx (step S140). The temperature raising control start temperature Tx is determined in advance according to the service environment of the hybrid vehicle 1, and is, for example, a temperature of around 600° C. in this embodiment.

When it is determined in step S140 that the temperature Tpf of the particulate filter 190 is equal to or higher than the temperature raising control start temperature Tx (step S140: NO), the engine ECU 100 ends the routine of FIG. 3 at that point for now. When it is determined in step S140 that the temperature Tpf of the particulate filter 190 is lower than the temperature raising control start temperature Tx (step S140: YES), the engine ECU 100 sends a catalyst temperature rise request signal for requesting execution of the catalyst temperature raising control routine to the HVECU 70 (step S150), and ends the routine of FIG. 3 for now. When execution of the catalyst temperature raising control routine is permitted by the HVECU 70 after the catalyst temperature rise request signal is sent, the engine ECU 100 turns a catalyst temperature rise flag on and starts the catalyst temperature raising control routine.

On the other hand, when it is determined in step S120 that the catalyst temperature raising control routine is already executed (step S120: NO), the engine ECU 100 determines whether or not the build-up amount Dpm calculated in step S110 is equal to or smaller than a predetermined threshold value D0 (e.g., a value of about 3000 mg) that is smaller than the threshold value D1 (step S160). When it is determined in step S160 that the build-up amount Dpm exceeds the threshold value D0 (step S160: NO), the engine ECU 100 ends the routine of FIG. 3 at that point for now. When it is determined in step S160 that the build-up amount Dpm is equal to or smaller than the threshold value D0 (step S160: YES), the engine ECU 100 turns the catalyst temperature rise flag off, ends the catalyst temperature raising control routine (step S170), and ends the routine of FIG. 3.

Figure 4:
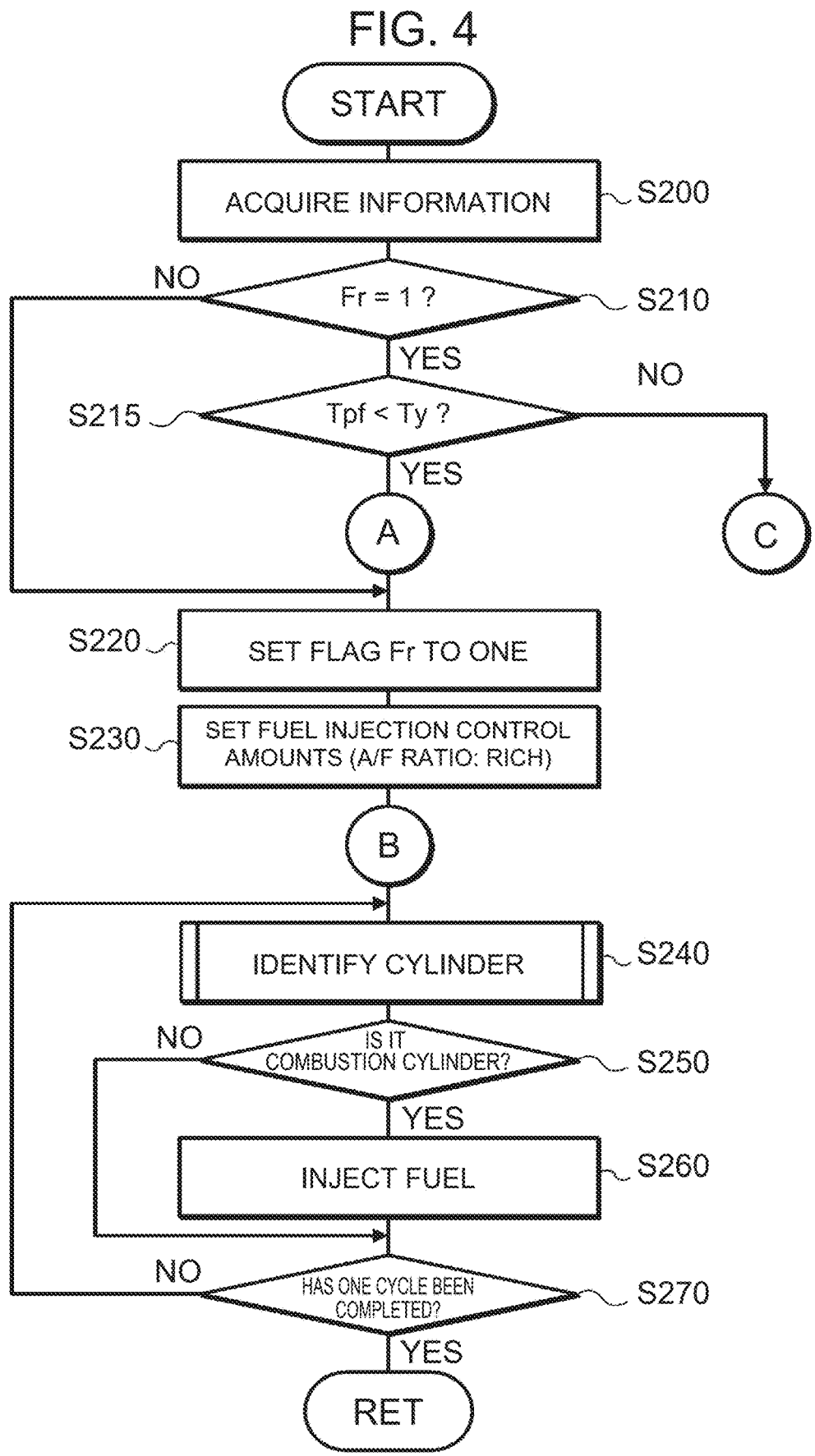
FIG. 4 is a flowchart illustrating a catalyst temperature raising control routine that is executed in the vehicle of FIG. 1.

Next, the catalyst temperature raising control routine for raising the temperatures of the exhaust gas control catalyst 180 and the particulate filter 190 will be described. FIG. 4 is a flowchart illustrating the catalyst temperature raising control routine that is executed by the engine ECU 100 at predetermined time intervals. The routine of FIG. 4 is executed while load operation of the engine 10 is performed according to the drivers pressing on the accelerator pedal 84, on the condition that execution of this routine is permitted by the HVECU 70, until the catalyst temperature rise flag is turned off in step S170 of FIG. 3.

At the start of the routine of FIG. 4, the engine ECU 100 acquires information required for the control, such as the intake air amount GA, the speed Ne, and the coolant temperature Tw of the engine 10, the temperature Tpf of the particulate filter 190, the crank position from the crank angle sensor 90, and the required power Pe* and the target speed Ne* from the HVECU 70 (step S200). After the process of step S200, the engine ECU 100 determines whether or not the value of an enrichment flag Fr is one (step S210). Before the routine of FIG. 4 is started, the value of the enrichment flag Fr is set to zero. When it is determined in step S210 that the value of the enrichment flag Fr is one (step S210: YES), the engine ECU 100 sets the value of the enrichment flag Fr to one (step S220).

Then, the engine ECU 100 sets fuel injection control amounts such as an amount of fuel injected from each port injection valve 15p or each cylinder injection valve 15d and a fuel injection end timing (step S230). In step S230, the engine ECU 100 sets to zero the amount of fuel injected into one predetermined cylinder 11 (e.g., the first cylinder #1) among the cylinders 11 of the engine 10. In step S230, the engine ECU 100 increases the amounts of fuel injected into the other cylinders 11 (e.g., the second cylinder #2, the third cylinder #3, and the fourth cylinder #4) than the one cylinder 11 each by, for example, 20% to 25% (in this embodiment, 20%) compared with the amount of fuel to be originally injected into the one cylinder 11 (first cylinder #1).

After setting the fuel injection control amounts in step S230, the engine ECU 100 identifies a cylinder 11 for which a fuel injection start timing has come based on the crank position from the crank angle sensor 90 (step S240). When it is determined, as a result of the identification process of step S240, that the fuel injection start timing for the one cylinder 11 (first cylinder #1) has come (step S250: NO), the engine ECU 100 does not inject fuel from the port injection valve 15p or the cylinder injection valve 15d corresponding to this one cylinder 11, and determines whether or not one cycle of fuel injection to rotate the engine 10 twice has been completed (step S270). While fuel supply to the one cylinder (first cylinder #1) is stopped (during fuel cutoff), the intake valve and the exhaust valve of this cylinder 11 are opened and closed in the same manner as when fuel is supplied thereto. When it is determined, as a result of the identification process of step S240, that the fuel injection start timing for one of the other cylinders 11 (the second cylinder #2, the third cylinder #3, or the fourth cylinder #4) has come (step S250: YES), the engine ECU 100 injects fuel into that cylinder 11 from the corresponding port injection valve 15p or cylinder injection valve 15d (step S260), and determines whether or not one cycle of fuel injection has been completed (step S270).

When it is determined in step S270 that one cycle of fuel injection has not yet been completed (step S270: NO), the engine ECU 100 repeatedly executes the processes of steps S240 to S260. While this routine is executed, the opening degree of the throttle valve 14 is set based on the required power Pe* and the target speed Ne* (required torque). Therefore, as a result of the processes of steps S240 to S270, fuel supply to the one cylinder 11 (first cylinder #1) is stopped and the air-fuel ratios for the other cylinders 11 (the second cylinder #2, the third cylinder #3, and the fourth cylinder #4) are enriched. Hereinafter, a cylinder 11 to which fuel supply is stopped will be referred to as a "fuel-cutoff cylinder" where appropriate, and a cylinder 11 to which fuel is supplied will be referred to as a "combustion cylinder" where appropriate. When it is determined in step S270 that one cycle of fuel injection has been completed (step S270: YES), the engine ECU 100 re-executes the processes of step S200 and the subsequent steps.

After setting the value of the enrichment flag Fr to one in step S220, the engine ECU 100 determines in step S210 that the value of the enrichment flag Fr is one (step S210: YES). In this case, the engine ECU 100 determines whether or not the temperature Tpf of the particulate filter 190 acquired in step S200 is lower than a predetermined regeneration allowing temperature (first determination threshold value) Ty (step S215). The regeneration allowing temperature Ty is a temperature equal to or slightly higher than a lower limit value of the temperature at which the particulate filter 190 can be regenerated, i.e., particulate matter can be combusted. The regeneration allowing temperature Ty is determined in advance according to the service environment of the hybrid vehicle 1, and is, for example, a temperature of around 650° C. in this embodiment. When it is determined in step S215 that the temperature Tpf of the particulate filter 190 is lower than the regeneration allowing temperature Ty (step S215: YES), the engine ECU 100 executes the processes of steps S230 to S270 and then re-executes the processes of step S200 and the subsequent steps.

Figure 5:
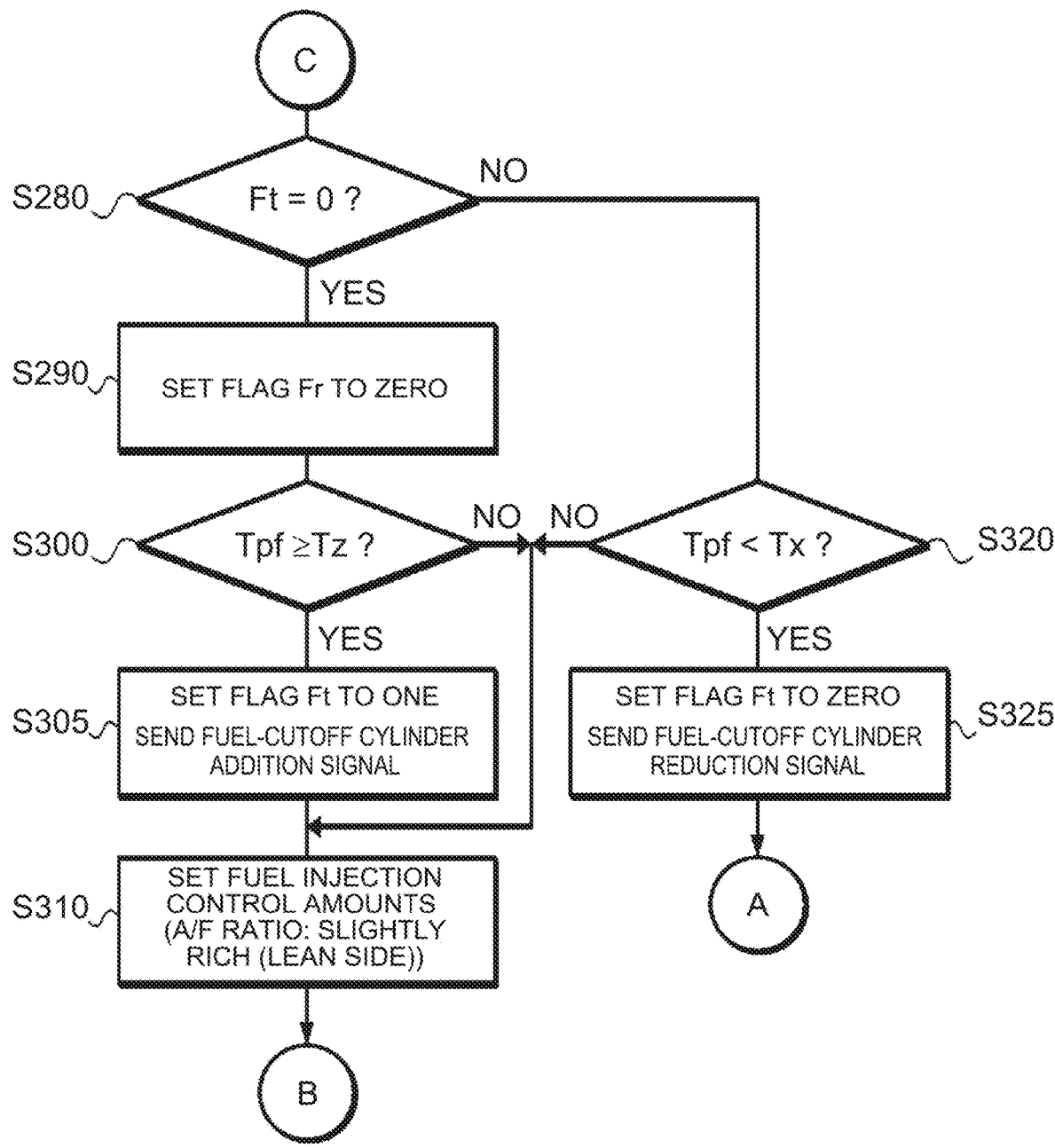
FIG. 5 is a flowchart illustrating the catalyst temperature raising control routine that is executed in the vehicle of FIG. 1.

When it is determined in step S215 that the temperature Tpf of the particulate filter 190 is equal to or higher than the regeneration allowing temperature Ty (step S215: NO), as shown in FIG. 5, the engine ECU 100 determines whether or not the value of a high temperature flag Ft is zero (step S280). Before the routine of FIG. 4 is started, the value of the high temperature flag Ft is set to zero. When it is determined in step S280 that the value of the high temperature flag Ft is zero (step S280: YES), the engine ECU 100 sets the value of the enrichment flag Fr to zero (step S290). After setting the value of the enrichment flag Fr to zero, the engine ECU 100 determines whether or not the temperature Tpf of the particulate filter 190 acquired in step S200 is equal to or higher than a predetermined regeneration promoting temperature (second determination threshold value) Tz (step S300). The regeneration promoting temperature Tz is a temperature at which regeneration of the particulate filter 190, i.e., combustion of particulate matter can be promoted. The regeneration promoting temperature Tz is determined in advance according to the service environment of the hybrid vehicle 1, and is, for example, a temperature of around 700° C. in this embodiment.

When it is determined in step S300 that the temperature Tpf of the particulate filter 190 is lower than the regeneration promoting temperature Tz (step S300: NO), the engine ECU 100 sets the fuel injection control amounts such as the amount of fuel injected from each port injection valve 15p or each cylinder injection valve 15d and the fuel injection end timing (step S310). In step S310, the engine ECU 100 sets the amount of fuel injected into the fuel-cutoff cylinder (first cylinder #1) among the cylinders 11 to zero. In step S310, the engine ECU 100 increases the amounts of fuel injected into all the other cylinders (the second cylinder #2, the third cylinder #3, and the fourth cylinder #4) than the fuel-cutoff cylinder (first cylinder #1) each by, for example, 3% to 7% (in this embodiment, 5%) compared with the amount of fuel to be originally injected into the fuel-cutoff cylinder.

After setting the fuel injection control amounts in step S310, the engine ECU 100 repeatedly executes the processes of steps S240 to S260 until it is determined in step S270 that one cycle of fuel injection has been completed. Thus, fuel supply to the one cylinder (fuel-cutoff cylinder) 11 (first cylinder #1) is stopped, and the air-fuel ratios for the other cylinders (combustion cylinders) 11 (the second cylinder #2, the third cylinder #3, and the fourth cylinder #4) are changed toward the lean side to slightly rich ratios compared with those when the process of step S230 is executed.

When it is determined in step S300 that the temperature Tpf of the particulate filter 190 is equal to or higher than the regeneration promoting temperature Tz (step S300: YES), the engine ECU 100 sets the value of the high temperature flag Ft to one (step S305). Further, in step S305, the engine ECU 100 sends a fuel-cutoff cylinder addition request signal for requesting addition of a fuel-cutoff cylinder to the HVECU 70. Then, the engine ECU 100 sets the fuel injection control amounts for each port injection valve 15p or each cylinder injection valve 15d (step S310), and repeatedly executes the processes of steps S240 to S260 until it is determined in step S270 that one cycle of fuel injection has been completed.

In this embodiment, the engine ECU 100 sends the fuel-cutoff cylinder addition request signal to the HVECU 70 once every two cycles (four rotations of the engine 10) after setting the value of the high temperature flag Ft to one in step S305. Whether or not to permit addition of a fuel-cutoff cylinder is determined by the HVECU 70. When the HVECU 70 permits addition of a fuel-cutoff cylinder, the engine ECU 100 selects (adds), as a new fuel-cutoff cylinder, a cylinder 11 (in this embodiment, the fourth cylinder #4) of which execution of fuel injection (ignition) is not continuous with that of the first cylinder #1 when the catalyst temperature raising control routine is not executed.

Further, when the HVECU 70 permits addition of a fuel-cutoff cylinder, in step S310, the engine ECU 100 sets the amounts of fuel injected into the fuel-cutoff cylinders (the first cylinder #1 and the fourth cylinder #4) among the cylinders 11 to zero. In step S310, the engine ECU 100 increases the amounts of fuel injected into all the other combustion cylinders (the second cylinder #2 and the third cylinder #3) than the fuel-cutoff cylinders each by, for example, 3% to 7% (in this embodiment, 5%) compared with the amount of fuel to be originally injected into one fuel-cutoff cylinder. Also in this case, after the process of step S310, the engine ECU 100 executes the processes of steps S240 to S270 and then re-executes the processes of step S200 and the subsequent steps. Thus, fuel supply to the two cylinders 11 (the first cylinder #1 and the fourth cylinder #4) is stopped, and the air-fuel ratios for the other cylinders 11 (the second cylinder #2 and the third cylinder #3) are changed toward the lean side to slightly rich ratios compared with those when the process of step S230 is executed.

After setting the value of the high temperature flag Ft to one in step S305, the engine ECU 100 determines in step S280 that the value of the high temperature flag Ft is one (step S280: NO). In this case, the engine ECU 100 determines whether or not the temperature Tpf of the particulate filter 190 acquired in step S200 is lower than the temperature raising control start temperature Tx (step S320). When it is determined in step S320 that the temperature Tpf of the particulate filter 190 is equal to or higher than the temperature raising control start temperature Tx (step S320: NO), the engine ECU 100 executes the processes of steps S310 and S240 to S270 and then re-executes the processes of step S200 and the subsequent steps. On the other hand, when it is determined in step S320 that the temperature Tpf of the particulate filter 190 is lower than the temperature raising control start temperature Tx (step S320: YES), the engine ECU 100 sets the value of the high temperature flag Ft to zero (step S325). Further, in step S325, the engine ECU 100 sends a fuel-cutoff cylinder reduction signal to the HVECU 70 to notify the HVECU 70 of resumption of fuel supply to that fuel-cutoff cylinder (fourth cylinder #4) that has been added earlier.

After the process of step S325, the engine ECU 100 sets the value of the enrichment flag Fr to one again in step S220 of FIG. 4. Further, the engine ECU 100 sets to zero the amount of fuel injected into the fuel-cutoff cylinder (first cylinder #1) of which stoppage of fuel supply continues, and increases the amounts of fuel injected into the other cylinders (combustion cylinders) 11 (the second cylinder #2, the third cylinder #3, and the fourth cylinder #4) each by 20% compared with the amount of fuel to be originally injected into the one fuel-cutoff cylinder (first cylinder #1) (step S230). Thus, as a result of the processes of steps S240 to S270, fuel supply to the one cylinder (fuel-cutoff cylinder) 11 (first cylinder #1) is stopped and the air-fuel ratios for the other cylinders (combustion cylinders) 11 (the second cylinder #2, the third cylinder #3, and the fourth cylinder #4) are enriched again.

Figure 6:
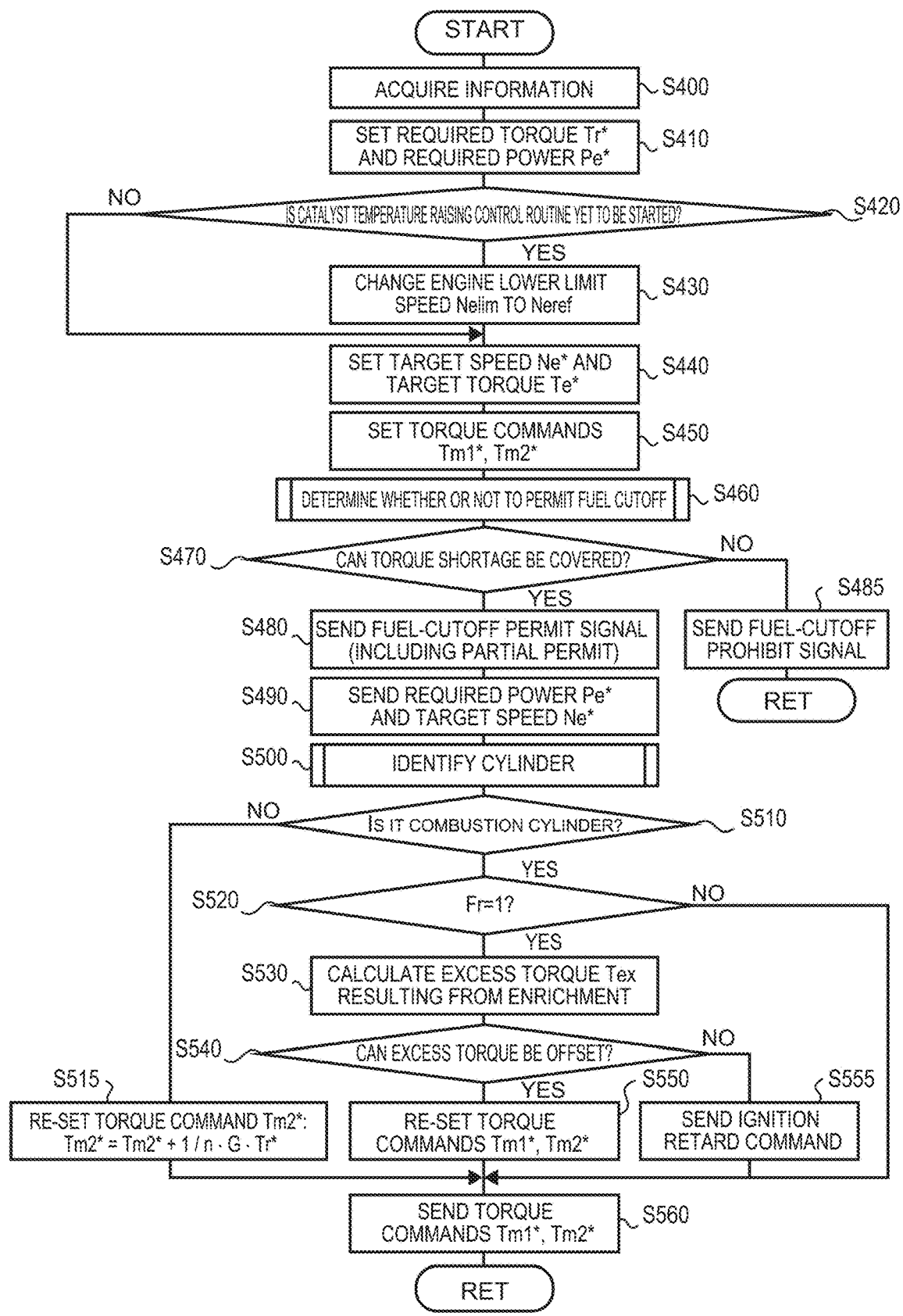
FIG. 6 is a flowchart illustrating a driving control routine that is executed in the vehicle of FIG. 1.

FIG. 6 is a flowchart illustrating a driving control routine that is executed by the HVECU 70 after the catalyst temperature rise request signal is sent by the engine ECU 100 in step S150 of FIG. 3, repeatedly at predetermined time intervals and concurrently with the catalyst temperature raising control routine.

At the start of the routine of FIG. 6, the HVECU 70 acquires information required for the control, such as the accelerator operation amount Acc; the vehicle speed V; the crank position from the crank angle sensor 90; the rotation speeds Nm1, Nm2 of the motor generators MG1, MG2; the SOC, the target charge-discharge electricity Pb*, the allowable charge electricity Win, and the allowable discharge electricity Wout of the electricity storage device 40; whether or not the fuel-cutoff cylinder addition request signal and the fuel-cutoff cylinder reduction signal have been received from the engine ECU 100; and the value of the enrichment flag Fr from the engine ECU 100 (step S400). Then, the HVECU 70 sets the required torque Tr* based on the accelerator operation amount Acc and the vehicle speed V, and sets the required power Pe* of the engine 10 based on the required torque Tr* (required travel power Pd*), the target charge-discharge electricity Pb* of the electricity storage device 40, etc. (step S410).

The HVECU 70 determines whether or not the catalyst temperature raising control routine of FIG. 4 and FIG. 5 is yet to be started by the engine ECU 100 (step S420). When it is determined in step S420 that the catalyst temperature raising control routine is yet to be started by the engine ECU 100 (step S420: YES), the HVECU 70 sets a predetermined value Neref as the lower limit speed Nelim that is the lower limit value of the speed of the engine 10 (step S430). The value Neref is a value larger by, for example, about 400 rpm to 500 rpm than the lower limit value of the speed of the engine 10 when the catalyst temperature raising control routine is not executed. The process of step S430 is skipped after the catalyst temperature raising control routine is started by the engine ECU 100.

After the process of step S420 or S430, the HVECU 70 derives, from a map (not shown), a speed which corresponds to the required power Pe* and at which the engine 10 can be efficiently operated, and sets the derived speed or the lower limit speed Nelim, whichever is higher, as the target speed Ne* of the engine 10 (step S440). In step S440, the HVECU 70 sets a value obtained by dividing the required power Pe* by the target speed Ne* as the target torque Te* of the engine 10. Further, within the ranges of the allowable charge electricity Win and the allowable discharge electricity Wout of the electricity storage device 40, the HVECU 70 sets the torque command Tm1* for the motor generator MG1 according to the target torque Te* and the target speed Ne*, and the torque command Tm2* for the motor generator MG2 according to the required torque Tr* and the torque command Tm1* (step S450).

Then, upon request from the engine ECU 100, the HVECU 70 determines whether or not to permit execution of the catalyst temperature raising control routine, i.e., stoppage of fuel supply to some cylinders 11 (hereinafter, "stoppage of fuel supply" will be referred to as "fuel cutoff" where appropriate) (step S460). In step S460, the HVECU 70 calculates a driving torque shortage resulting from fuel cutoff of one cylinder 11, i.e., a torque that is not output from the engine 10 as a result of fuel cutoff (hereinafter referred to as a "torque shortage" where appropriate). More specifically, the HVECU 70 calculates a torque shortage by multiplying a value, obtained by dividing the required torque Tr* set in step S410 by the number of cylinders n of the engine 10 (in this embodiment, n=4), by a gear ratio G between the rotor of the motor generator MG2 and the drive shaft DS (=Tr*·G/n). Further, in step S460, the HVECU 70 determines whether or not this torque shortage can be covered by the motor generator MG2 based on the torque shortage, the torque commands Tm1*, Tm2* set in step S450, and the allowable charge electricity Win and the allowable discharge electricity Wout of the electricity storage device 40. When the fuel-cutoff cylinder addition request signal or the fuel-cutoff cylinder reduction signal has been received from the engine ECU 100, the HVECU 70 determines whether or not the torque shortage can be covered, with an increase or a decrease in the number of the fuel-cutoff cylinders taken into account.

When it is determined, as a result of the determination process of step S460, that the driving torque shortage resulting from fuel cutoff of some (one or two) cylinders 11 can be covered by the motor generator MG2 (step S470: YES), the HVECU 70 sends a fuel cutoff permit signal to the engine ECU 100 (step S480). The fuel cutoff permit signal includes a signal that permits fuel cutoff of only one cylinder 11 when the fuel-cutoff cylinder addition request signal is sent from the engine ECU 100. When it is determined, as a result of the determination process of step S460, that the driving torque shortage resulting from fuel cutoff of some cylinders 11 cannot be covered by the motor generator MG2 (step S470: NO), the HVECU 70 sends a fuel cutoff prohibit signal to the engine ECU 100 (step S485), and ends the routine of FIG. 6 for now. In this case, execution of the catalyst temperature raising control routine by the engine ECU 100 is canceled or stopped.

When the HVECU 70 sends the fuel cutoff permit signal to the engine ECU 100 in step S480, the HVECU 70 sends the required power Pe* set in step S410 and the target speed Ne* set in step S440 to the engine ECU 100 (step S490). Further, the HVECU 70 identifies the cylinder 11 for which the fuel injection start timing will come next based on the crank position from the crank angle sensor 90 (step S500). When it is determined, as a result of the identification process of step S500, that the fuel injection start timing for the fuel-cutoff cylinder (the first cylinder #1, or both the first cylinder #1 and the fourth cylinder #4) will come (step S510: NO), the HVECU 70 re-sets the torque command Tm2* for the motor generator MG2 (step S515).

In step S515, the HVECU 70 sets the sum of the torque command Tm2* set in step S450 and the torque shortage (=Tr*·G/n) as a new torque command Tm2*. After the process of step S515, the HVECU 70 sends the torque command Tm1* set in step S450 and the torque command Tm2* re-set in step S515 to the MGECU 55 (step S560), and ends the routine of FIG. 6 for now. Thus, while fuel supply to one of the cylinders 11 of the engine 10 is stopped (during fuel cutoff), the motor generator MG1 is controlled by the MGECU 55 so as to rotate the engine 10 at the target speed Ne*, and the motor generator MG2 is controlled by the MGECU 55 so as to cover the torque shortage.

On the other hand, when it is determined, as a result of the identification process of step S500, that the fuel injection start timing for the combustion cylinders (the second cylinder #2 to the fourth cylinder #4, or both the second cylinder #2 and the third cylinder #3) will come (step S510: YES), the HVECU 70 determines whether or not the value of the enrichment flag Fr acquired in step S400 is one (step S520). When it is determined in step S520 that the value of the enrichment flag Fr is one (step S520: YES), the HVECU 70 calculates, from the accelerator operation amount Acc or the target torque Te* and from a fuel increase rate (in this embodiment, 20%) for one combustion cylinder used in step S230 of FIG. 4, an excess torque Tex (positive value) of the engine 10 resulting from enrichment of the air-fuel ratio for one combustion cylinder (step S530).

Further, the HVECU 70 determines, based on the excess torque Tex, the target speed Ne* and the target torque Te* set in step S440, the torque command Tm1* set in step S450, the allowable charge electricity Win of the electricity storage device 40, etc., whether or not the electricity storage device 40 can be charged with electricity that is generated by the motor generator MG1 when the excess torque Tex is offset while the engine 10 is rotated at the target speed Ne* by the motor generator MG1 (step S540). When it is determined in step S540 that the excess torque Tex can be offset by the motor generator MG1 (step S540: YES), the HVECU 70 re-sets the torque commands Tm1*, Tm2* with the excess torque Tex taken into account (step S550).

In step S550, the HVECU 70 sets a new torque command Tm1* by adding, to the torque command Tm1* set in step S450, the value (negative value) of a component of the excess torque Tex that acts on the motor generator MG1 through the planetary gear 30. In step S550, the HVECU 70 sets a new torque command Tm2* by decreasing, from the torque command Tm2*, the value (positive value) of a component of the excess torque Tex that is transmitted to the drive shaft DS through the planetary gear 30. After the process of step S550, the HVECU 70 sends the re-set torque commands Tm1*, Tm2* to the MGECU 55 (step S560), and ends the routine of FIG. 6 for now. Thus, when the excess torque Tex can be offset by the motor generator MG1, the motor generator MG1 is controlled by the MGECU 55 so as to rotate the engine 10 at the target speed Ne* and convert the excess power of the engine 10 based on the excess torque Tex into electricity, while fuel is supplied to all the combustion cylinders other than the fuel-cutoff cylinder such that the air-fuel ratios for these combustion cylinders are enriched in steps S230 to S270 of FIG. 4. Meanwhile, the motor generator MG2 is controlled by the MGECU 55 so as to output a torque according to the torque command Tm2* set in step S450, without covering the torque shortage.

Figure 7:
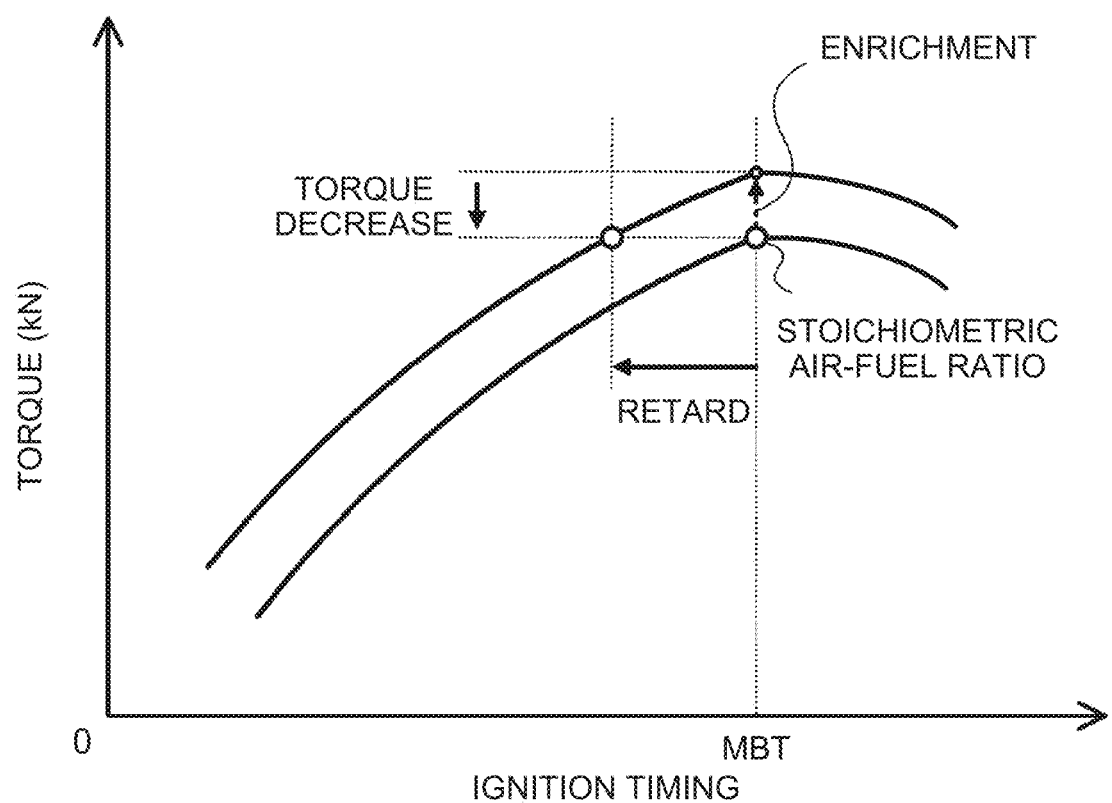
FIG. 7 is a graph showing a relationship between a torque output from the multi-cylinder engine and ignition timing.

On the other hand, when it is determined in step S540 that the excess torque Tex cannot be offset by the motor generator MG1 (step S540: NO), the HVECU 70 sends an ignition retard request signal for requesting retarding of the ignition timing to the engine ECU 100 (step S555). Further, the HVECU 70 sends the torque commands Tm1*, Tm2* set in step S450 to the MGECU 55 (step S560), and ends the routine of FIG. 6 for now. Thus, when the excess torque Tex cannot be offset by the motor generator MG1, the motor generator MG1 is controlled by the MGECU 55 so as to rotate the engine 10 at the target speed Ne*, while fuel is supplied to all the combustion cylinders other than the fuel-cutoff cylinder such that the air-fuel ratios for these combustion cylinders are enriched in steps S230 to S270 of FIG. 4. Meanwhile, the motor generator MG2 is controlled by the MGECU 55 so as to output a torque according to the torque command Tm2* set in step S450, without covering the torque shortage. Upon receiving the ignition retard request signal from the HVECU 70, as shown in FIG. 7, the engine ECU 100 retards the ignition timing for each combustion cylinder from an optimal ignition timing (MBT) such that the output torque of the engine 10 becomes equivalent to that when the air-fuel ratios for the combustion cylinders are set to the stoichiometric air-fuel ratio.

When it is determined in step S520 that the value of the enrichment flag Fr is zero (step S520: NO), the HVECU 70 sends the torque commands Tm1*, Tm2* set in step S450 to the MGECU 55 (step S560), and ends the routine of FIG. 6 for now. Thus, when the value of the enrichment flag Fr is zero, the motor generator MG1 is controlled by the MGECU 55 so as to rotate the engine 10 at the target speed Ne*, while fuel is supplied to all the combustion cylinders other than the fuel-cutoff cylinder such that the air-fuel ratios for these combustion cylinders assume a value on the lean side (slightly rich value) in step S310 of FIG. 5 and steps S240 to S270 of FIG. 4. Meanwhile, the motor generator MG2 is controlled by the MGECU 55 so as to output a torque according to the torque command Tm2* set in step S450, without covering the torque shortage.

In the hybrid vehicle 1, as a result of execution of the routines shown in FIG. 3 to FIG. 6, when the build-up amount Dpm of particulate matter on the particulate filter 190 of the downstream control apparatus 19 becomes equal to or larger than the threshold value D1, the catalyst temperature rise request signal is sent from the engine ECU 100 to the HVECU 70 to raise the temperatures of the exhaust gas control catalyst 180 of the upstream control apparatus 18 and the particulate filter 190 of the downstream control apparatus 19 (step S150 of FIG. 3). When a temperature rise of the particulate filter 190 etc. is permitted by the HVECU 70, the engine ECU 100 executes the catalyst temperature raising control routine (FIG. 4 and FIG. 5) that involves stopping fuel supply to at least one of the cylinders 11 of the engine 10 and supplying fuel to the other cylinders 11 while load operation of the engine 10 is performed according to the driver's pressing on the accelerator pedal 84. During execution of the catalyst temperature raising control routine, the HVECU 70 controls the motor generator MG2 as a motive power generating device so as to cover a torque shortage (driving power shortage) resulting from stoppage of fuel supply to at least one of the cylinders 11 (FIG. 6).

Thus, the torque shortage resulting from stoppage of fuel supply to some of the cylinders 11 can be covered by the motor generator MG2 with high accuracy and responsiveness, and a torque according to the required torque Tr* can be output to the wheels W during execution of the catalyst temperature raising control routine. The HVECU 70 (and the MGECU 55) controls the motor generator MG2 (electric motor) so as to cover the torque shortage while fuel supply to at least one of the cylinders 11 is stopped (during fuel cutoff) (steps S515 and S560 of FIG. 6). Thus, deterioration in the drivability of the hybrid vehicle 1 can be highly reliably avoided during execution of the catalyst temperature raising control routine.

The HVECU 70 sets the lower limit speed Nelim of the engine 10 to be higher when the catalyst temperature raising control routine is being executed than when the catalyst temperature raising control routine is not being executed (step S430 of FIG. 6). This can shorten the time during which fuel supply to some cylinders 11 is stopped, i.e., the time during which no torque is output from the engine 10 due to fuel cutoff. Thus, the hybrid vehicle 1 can highly reliably prevent problems due to fuel cutoff of some cylinders 11 such as vibration of the engine 10 from surfacing.

Figure 8:
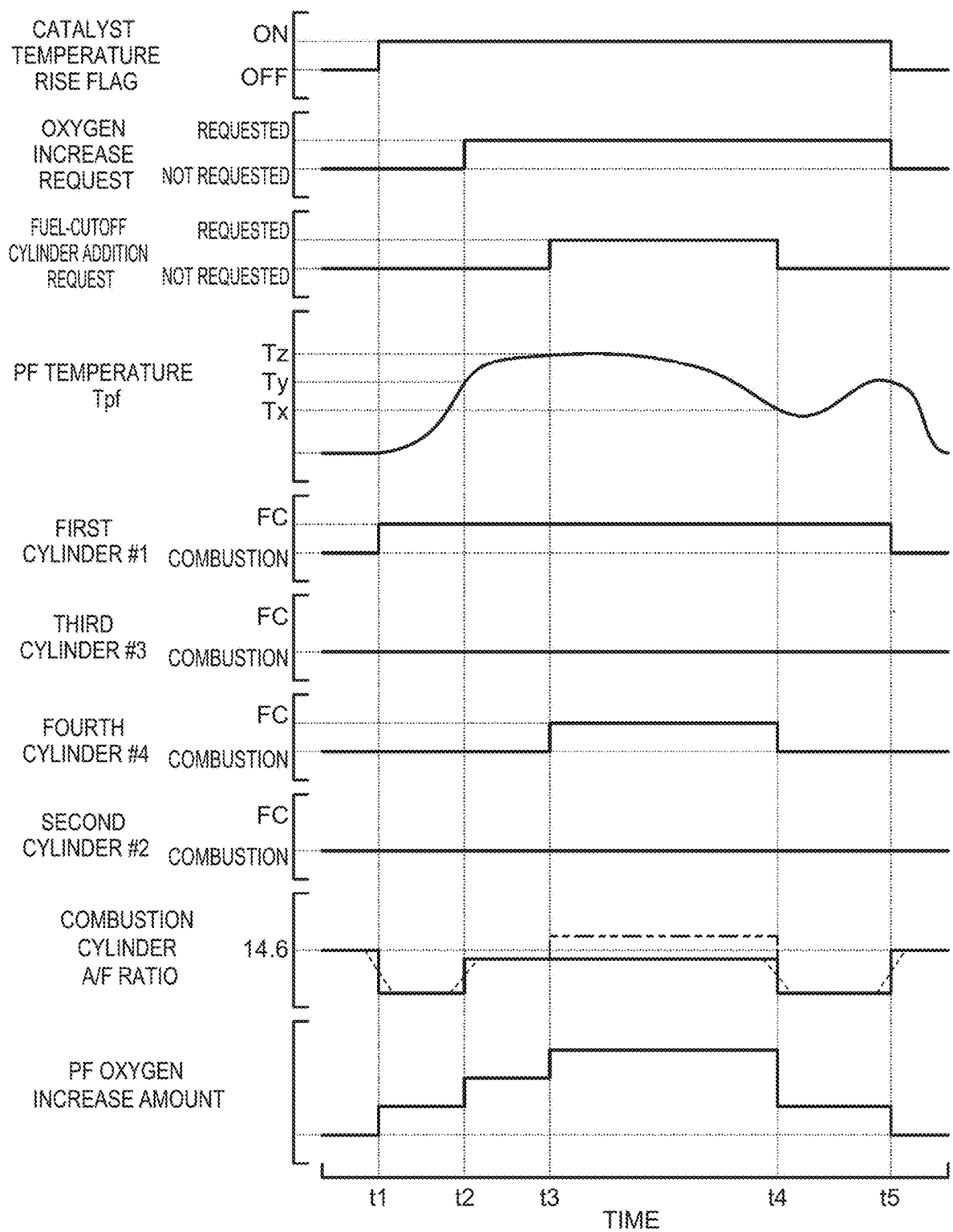
FIG. 8 is a time chart showing the operating state of the multi-cylinder engine and changes in the temperature of the particulate filter during execution of the routines shown in FIG. 4 to FIG. 6.

When execution of the catalyst temperature raising control routine is permitted by the HVECU 70 (time t1 in FIG. 8), the engine ECU 100 stops fuel supply to one of the cylinders 11 (first cylinder #1) of the engine 10 and enriches the air-fuel ratios for the other cylinders (the second cylinder #2, the third cylinder #3, and the fourth cylinder #4) (steps S230 to S270 of FIG. 4). Thus, a relatively large amount of air, i.e., oxygen is introduced into the upstream and downstream control apparatuses 18, 19 from the cylinder 11 (fuel-cutoff cylinder) to which fuel supply is stopped, and a relatively large amount of uncombusted fuel is introduced into these apparatuses from the cylinders 11 (combustion cylinders) to which fuel is supplied. Specifically, the upstream and downstream control apparatuses 18, 19 are supplied with an amount of air (that is not a lean atmospheric gas but air containing almost no fuel components) roughly equal to the capacity (volume) of the cylinder 11 from the fuel-cutoff cylinder. As a result, during load operation of the engine 10, a relatively large amount of uncombusted fuel can be caused to react in the presence of sufficient oxygen, and the temperatures of the exhaust gas control catalyst 180 and the particulate filter 190 supporting an exhaust gas control catalyst can be sufficiently and quickly raised with the heat of the reaction as shown in FIG. 8.

While fuel is thus supplied to all the combustion cylinders other than the fuel-cutoff cylinder so as to enrich the air-fuel ratios for these combustion cylinders, the HVECU 70 (and the MGECU 55) controls the motor generator MG1 (second electric motor) so as to convert excess power of the engine 10 resulting from enrichment of the air-fuel ratios for the other cylinders 11 (combustion cylinders) into electricity (steps S510 to S560 of FIG. 6). Thus, it is possible to avoid reducing the fuel efficiency of the engine 10 as a result of execution of the catalyst temperature raising control routine, without complicating the control of the motor generator MG2 that covers a torque shortage.

When charging of the electricity storage device 40 is limited and the excess power of the engine 10 cannot be converted into electricity by the motor generator MG1, the HVECU 70 sends the ignition retard request signal for requesting retarding of the ignition timing to the engine ECU 100 (step S555 of FIG. 6). Upon receiving the ignition retard request signal, the engine ECU 100 retards the ignition timing for the combustion cylinder from the optimal ignition timing (MBT). Thus, even when charging of the electricity storage device 40 with electricity generated by the motor generator MG1 is limited, the drivability of the hybrid vehicle 1 can be reliably secured by avoiding an increase in the output torque of the engine 10 resulting from enrichment of the air-fuel ratio for the combustion cylinder.

During execution of the catalyst temperature raising control, after the temperature Tpf of the particulate filter 190 becomes equal to or higher than the regeneration allowing temperature Ty (first determination threshold value) (time t2 in FIG. 8), the engine ECU 100 changes the air-fuel ratios for all the other cylinders 11 (combustion cylinders) toward the lean side to slightly rich ratios while stopping fuel supply to the one cylinder 11 (first cylinder #1) (step S310 of FIG. 5 etc.). Further, during execution of the catalyst temperature raising control, after the temperature Tpf of the particulate filter 190 becomes equal to or higher than the regeneration promoting temperature Tz (second determination threshold value) higher than the regeneration allowing temperature Ty (time t3 in FIG. 8), the engine ECU 100 stops fuel supply to one of the other cylinders 11 (fourth cylinder #4) (step S305 of FIG. 5 etc.), on the condition that the torque shortage resulting from execution of the catalyst temperature raising control routine can be covered by the motor generator MG2 (steps S460 to S480 of FIG. 6).

Thus, it is possible to supply more oxygen from more than one fuel-cutoff cylinder into the upstream and downstream control apparatuses 18, 19 of which the temperatures have been sufficiently raised, while stably operating the engine 10 in which fuel supply to some cylinders 11 is stopped. Therefore, the hybrid vehicle 1 can introduce a larger amount of oxygen from more than one fuel-cutoff cylinder to the particulate filter 190 of which the temperature has been raised along with the temperature of the exhaust gas control catalyst, and thereby reliably combust particulate matter having built up on the particulate filter 190. The hybrid vehicle 1 can also reliably mitigate S- and HC-poisoning of the exhaust gas control catalyst 180 of the upstream control apparatus 18.

When addition of a fuel-cutoff cylinder is permitted by the HVECU 70, the engine ECU 100 selects, as a new fuel-cutoff cylinder, the cylinder 11 (fourth cylinder #4) of which execution of fuel injection (ignition) is not continuous with that of the one cylinder 11 (first cylinder #1) when the catalyst temperature raising control routine is not executed. Specifically, when stopping fuel supply to two cylinders (more than one cylinder) 11, the engine ECU 100 executes the catalyst temperature raising control routine so as to supply fuel to at least one of the cylinders 11 after stopping fuel supply to one of the cylinders 11. Thus, stoppage of fuel supply to one cylinder 11 and that to another cylinder 11 do not occur in succession, so that deterioration in terms of engine sound and fluctuation in torque output from the engine 10 can be avoided.

When the temperature Tpf of the particulate filter 190 becomes lower than the temperature raising control start temperature Tx (time t4 in FIG. 8) after a fuel-cutoff cylinder is added, as shown in FIG. 8, the engine ECU 100 reduces the number of the fuel-cutoff cylinders and enriches the air-fuel ratios for the cylinders 11 (combustion cylinders) to which fuel is supplied (step S325 of FIG. 5 and steps S220 to S270 of FIG. 4). Thus, when the temperatures of the upstream and downstream control apparatuses 18, 19 decrease as a fuel-cutoff cylinder is added and the amount of air introduced into these apparatuses increases, it is possible to raise the temperatures of the upstream and downstream control apparatuses 18, 19 again by enriching the air-fuel ratios for the combustion cylinders, and keep the temperatures of the upstream and downstream control apparatuses 18, 19 from decreasing by reducing the number of fuel-cutoff cylinders so as to reduce the amount of air introduced into these apparatuses.

When the build-up amount Dpm on the particulate filter 190 becomes equal to or smaller than the threshold value D0 (time t5 in FIG. 8), the engine ECU 100 turns the catalyst temperature rise flag off and ends the catalyst temperature raising control routine. However, when the time during which the accelerator is pressed is relatively short and the build-up amount Dpm on the particulate filter 190 does not become equal to or smaller than the threshold value D0 during that time, the routines of FIG. 4 to FIG. 6 are interrupted for now and resumed when the driver presses on the accelerator pedal 84 next time.

As has been described above, during load operation of the engine 10, the hybrid vehicle 1 can sufficiently and quickly raise the temperatures of the upstream and downstream control apparatuses 18, 19 and supply a sufficient amount of oxygen to the upstream and downstream control apparatuses 18, 19 to regenerate the exhaust gas control catalyst 180 and the particulate filter 190, while avoiding deteriorating the drivability. The above-described catalyst temperature raising control routine can regenerate the particulate filter 190 by reliably combusting particulate matter having built up on the particulate filter 190, even in a low-temperature environment where a large amount of particulate matter tends to build up on the particulate filter 190, particularly in an extremely low-temperature environment where the daily mean temperature can fall below
20° C.

In the above embodiment, the air-fuel ratios for all the combustion cylinders other than the fuel-cutoff cylinder are enriched when execution of the catalyst temperature raising control routine is permitted. However, the disclosure is not limited to this aspect. At the start of the catalyst temperature raising control routine, the hybrid vehicle 1 may set the air-fuel ratios for the combustion cylinders to the stoichiometric air-fuel ratio instead of enriching the air-fuel ratios for the combustion cylinders. The hybrid vehicle 1 having this aspect takes more time to raise the temperatures of the upstream and downstream control apparatuses 18, 19 than when the air-fuel ratios for the combustion cylinders are enriched, but can cause uncombusted fuel to react in the presence of sufficient oxygen and sufficiently raise the temperatures of the upstream and downstream control apparatuses 18, 19 with the heat of reaction. Moreover, with stoppage of fuel supply to some cylinders 11 continued, a sufficient amount of oxygen can be supplied into the upstream and downstream control apparatuses 18, 19 of which the temperatures have been raised.

In the above embodiment, the air-fuel ratios for all the combustion cylinders are changed toward the lean side after the temperature Tpf of the particulate filter 190 becomes equal to or higher than the regeneration allowing temperature Ty (first determination threshold value). However, the disclosure is not limited to this aspect. The hybrid vehicle 1 may maintain the air-fuel ratios for the other cylinders 11 than the fuel-cutoff cylinder at rich ratios until the temperature Tpf of the particulate filter 190 reaches the regeneration promoting temperature Tz (determination threshold value). After the temperature Tpf becomes equal to or higher than the regeneration promoting temperature Tz, the hybrid vehicle 1 may stop fuel supply to one of the other cylinders 11 and change the air-fuel ratio for a cylinder 11 among the other cylinders 11 to which fuel supply is not stopped toward the lean side (to a slightly rich ratio), on the condition that the torque shortage can be covered by the motor generator MG2. The hybrid vehicle 1 having this aspect can supply more oxygen into the upstream and downstream control apparatuses 18, 19 after sufficiently and quickly raising the temperatures of the exhaust gas control catalyst 180 and the particulate filter 190.

In step S310 of FIG. 5, the fuel injection amounts may be set such that the air-fuel ratios for all the combustion cylinders other than the fuel-cutoff cylinder become lean. When the temperature Tpf of the particulate filter 190 becomes equal to or higher than the regeneration promoting temperature Tz, the hybrid vehicle 1 may change the air-fuel ratios for all the combustion cylinders other than the fuel-cutoff cylinder to lean ratios, as indicated by the long dashed double-short dashed line in FIG. 8, instead of adding a fuel-cutoff cylinder. When changing the air-fuel ratios for the combustion cylinders during execution of the catalyst temperature raising control routine, the hybrid vehicle 1 may gradually change the air-fuel ratio for each combustion cylinder, for example, according to changes in the temperature Tpf of the particulate filter 190, as indicated by the dashed line in FIG. 8.

The hybrid vehicle 1 may convert the excess power of the engine 10 resulting from enrichment of the air-fuel ratio for the combustion cylinder into electricity by the motor generator MG2 instead of the motor generator MG1. In this case, it is determined in step S540 of FIG. 6 whether or not the electricity storage device 40 can be charged with electricity that is generated by the motor generator MG2 when the excess torque Tex is offset by the motor generator MG2. Then, in step S550 of FIG. 6, the torque command Tm2* is re-set by decreasing a torque corresponding to the excess torque Tex from the torque command Tm2* set in step S450. In step S560, the torque command Tm1* set in step S450 and the torque command Tm2* re-set in step S550 are sent to the MGECU 55. The ignition retard request signal may be sent to the engine ECU 100 every time it is determined in step S520 of FIG. 6 that the value of the enrichment flag Fr is one. The hybrid vehicle 1 having these aspects can also reliably secure the drivability by outputting a torque according to the required torque Tr* to the wheels W when enriching the air-fuel ratio for the combustion cylinder during execution of the catalyst temperature raising control routine.

The engine 10 of the hybrid vehicle 1 is an in-line engine, and the catalyst temperature raising control routine is configured to stop fuel supply to at least one cylinder 11 during one cycle. However, the disclosure is not limited to this aspect. The engine 10 of the hybrid vehicle 1 may be a V-engine, a horizontally opposed engine, or a W-engine in which each bank is provided with an exhaust gas control apparatus. In this case, the catalyst temperature raising control routine can be configured such that fuel supply to at least one cylinder in each bank is stopped during one cycle. Thus, sufficient oxygen can be sent to the exhaust gas control apparatus in each bank of the V-engine etc.

The downstream control apparatus 19 may include an exhaust gas control catalyst (three-way catalyst) disposed on the upstream side and a particulate filter disposed downstream of this exhaust gas control catalyst. In this case, the upstream control apparatus 18 may be omitted from the hybrid vehicle 1. Alternatively, the downstream control apparatus 19 may include only a particulate filter. In this case, when the temperature of the exhaust gas control catalyst of the upstream control apparatus 18 is raised by executing the catalyst temperature raising control routine, the temperature of the downstream control apparatus 19 (particulate filter 190) can be raised with high-temperature exhaust gas flowing in from the upstream control apparatus 18.

In the hybrid vehicle 1, the motor generator MG1 may be coupled to the sun gear 31 of the planetary gear 30; the output member may be coupled to the ring gear 32; and the engine 10 and the motor generator MG2 may be coupled to the planetary carrier 34. A stepped transmission may be coupled to the ring gear 32 of the planetary gear 30. The planetary gear 30 of the hybrid vehicle 1 may be substituted by a four-element compound planetary gear mechanism including two planetary gears. In this case, the engine 10 may be coupled to an input element of the compound planetary gear mechanism; the output member may be coupled to an output element; the motor generator MG1 may be coupled to one of the other two rotating elements; and the motor generator MG2 may be coupled to the other rotating element. The compound planetary gear mechanism may be provided with a clutch that couples together two of the four rotating elements, and a brake that can fix one of the rotating elements so as not to rotate. The hybrid vehicle 1 may be configured as a plug-in hybrid vehicle of which the electricity storage device 40 can be charged with electricity from an external power source, such as a household power source or a quick charger installed in a filling station.

Figure 9:
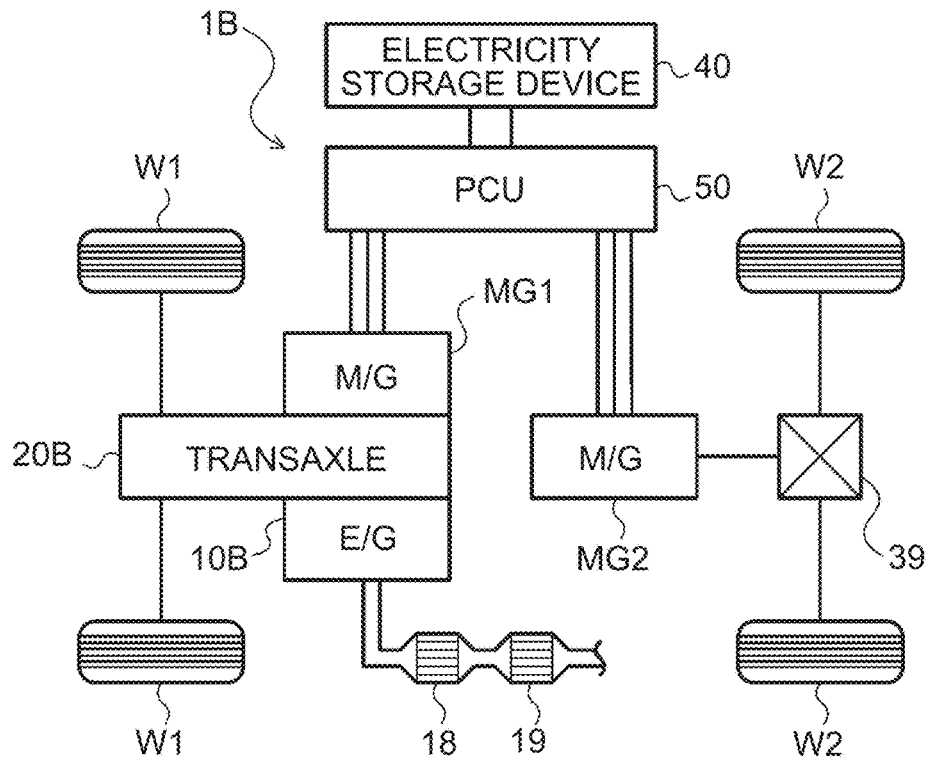
FIG. 9 is a schematic configuration diagram showing another vehicle of this disclosure.

FIG. 9 is a schematic configuration diagram showing a hybrid vehicle 1B that is another vehicle of this disclosure. Those components of the hybrid vehicle 1B that are the same as in the hybrid vehicle 1 will be denoted by the same reference signs and an overlapping description will be omitted.

The hybrid vehicle 1B shown in FIG. 9 is a series-parallel hybrid vehicle including an engine (internal combustion engine) 10B having a plurality of cylinders (not shown), the motor generators (synchronous motor-generators) MG1, MG2, and a transaxle 20B. The engine 10B includes the upstream control apparatus 18 and the downstream control apparatus 19 as exhaust gas control apparatuses. A crankshaft (not shown) of the engine 10B, the rotor of the motor generator MG1, and a wheel W1 are coupled to the transaxle 20B. Further, the motor generator MG2 is coupled to a wheel W2 different from the wheel W1. Alternatively, the motor generator MG2 may be coupled to the wheel W1. The transaxle 20B may include a stepped transmission, a continuously variable transmission, a dual-clutch transmission, or the like.

When operation of the engine 10B is stopped, the hybrid vehicle 1B can travel on a driving torque (driving power) from at least one of the motor generators MG1, MG2 that are driven with electricity from the electricity storage device 40. The hybrid vehicle 1B can also convert all power from the engine 10B in load operation into electricity by the motor generator MG1, and drive the motor generator MG2 with electricity from the motor generator MG1. In addition, the hybrid vehicle 1B can transmit a driving torque (driving power) from the engine 10B in load operation to the wheel W1 through the transaxle 20B.

In the hybrid vehicle 1B, the same catalyst temperature raising control routine as that shown in FIG. 4 and FIG. 5 is executed by an engine ECU (not shown) while a driving torque from the engine 10B in load operation is transmitted to the wheel W1 through the transaxle 20B. During execution of the catalyst temperature raising control routine, the motor generator MG2 is controlled so as to cover a driving torque shortage resulting from fuel cutoff of some cylinders of the engine 10B. Thus, the hybrid vehicle 1B can achieve operational effects similar to those of the hybrid vehicle 1. In the hybrid vehicle 1B, the transmission included in the transaxle 20B may be downshifted (the gear ratio may be changed) as necessary so as to set the speed of the engine 10B to or above a predetermined speed during execution of the catalyst temperature raising control routine. Thus increasing the speed of the engine 10B can shorten the time during which fuel supply to some cylinders is stopped, so that problems such as vibration of the engine 10B can be highly reliably prevented from surfacing.

Figure 10:
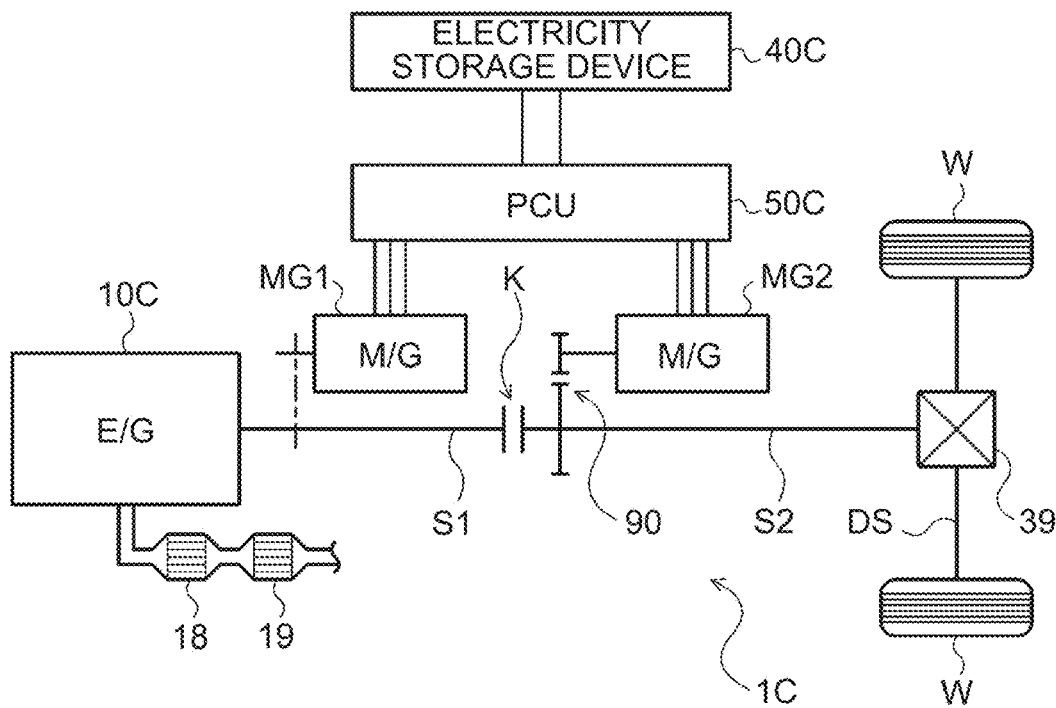
FIG. 10 is a schematic configuration diagram showing yet another vehicle of this disclosure.

FIG. 10 is a schematic configuration diagram showing a hybrid vehicle 1C that is yet another vehicle of this disclosure. Those components of the hybrid vehicle 1C that are the same as in the hybrid vehicle 1 etc. will be denoted by the same reference signs and an overlapping description will be omitted.

The hybrid vehicle 1C shown in FIG. 10 is a series-parallel hybrid vehicle including an engine (internal combustion engine) 10C having a plurality of cylinders (not shown), and the motor generators (synchronous motor-generators) MG1, MG2. In the hybrid vehicle 1C, a crankshaft of the engine 10C and the rotor of the motor generator MG1 are coupled to a first shaft S1, and the motor generator MG1 can convert at least part of power from the engine 10C into electricity. The rotor of the motor generator MG2 is coupled to a second shaft S2 directly or through a power transmission mechanism 120 including a gear train, and the second shaft S2 is coupled to the wheels W through the differential gear 39 etc. Alternatively, the motor generator MG2 may be coupled to other wheels (not shown) than the wheels W. The hybrid vehicle 1C further includes a clutch K that connects and disconnects the first shaft S1 and the second shaft S2 to and from each other. In the hybrid vehicle 1C, the power transmission mechanism 120, the clutch K, and the differential gear 39 may be included in the transaxle.

When the clutch K is engaged, the hybrid vehicle 1C can output a driving torque from the engine 10C to the second shaft S2, i.e., the wheels W. In the hybrid vehicle 1C, the same catalyst temperature raising control routine as that shown in FIG. 4 and FIG. 5 is executed by an engine ECU (not shown) while the crankshaft of the engine 10C and the second shaft S2, i.e., the wheels W are coupled together by the clutch K and load operation of the engine 10C is performed according to a driver's pressing on the accelerator pedal. During execution of the catalyst temperature raising control routine, the motor generator MG2 is controlled so as to cover a driving torque shortage resulting from fuel cutoff of some cylinders of the engine 10C. Thus, the hybrid vehicle 1C can achieve operational effects similar to those of the hybrid vehicle 1 etc.

Figure 11:
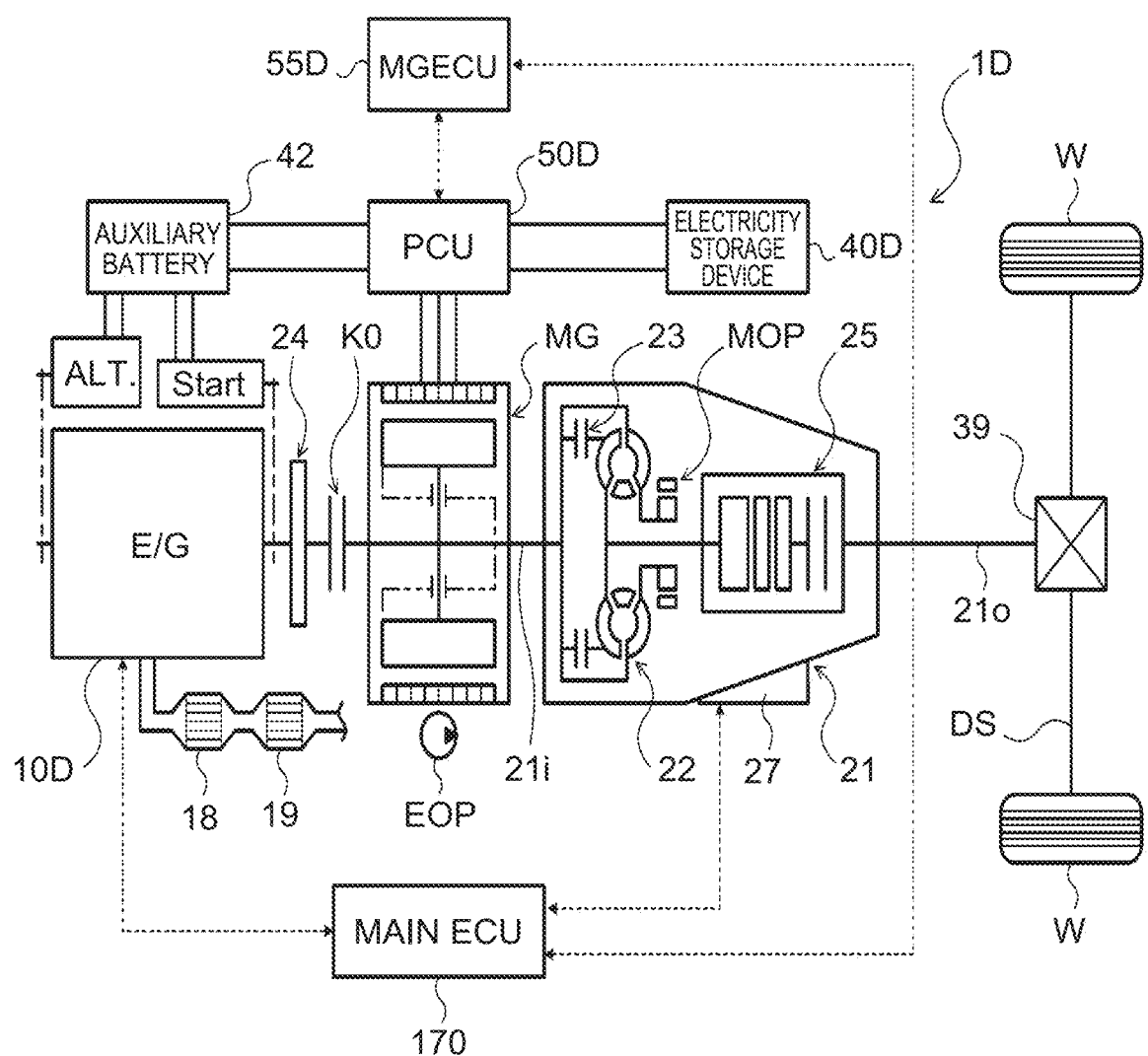
FIG. 11 is a schematic configuration diagram showing another vehicle of this disclosure.

FIG. 11 is a schematic configuration diagram showing a hybrid vehicle 1D that is another vehicle of this disclosure. Those components of the hybrid vehicle 1D that are the same as in the hybrid vehicle 1 etc. will be denoted by the same reference signs and an overlapping description will be omitted.

The hybrid vehicle 1D shown in FIG. 11 is a parallel hybrid vehicle including: an engine (internal combustion engine) 10D having a plurality of cylinders (not shown); a motor generator (synchronous motor-generator) MG; a hydraulic clutch K0; a power transmission device 21; an electricity storage device (high-voltage battery) 40D; an auxiliary battery (low-voltage battery) 42; a PCU 50D that drives the motor generator MG; an MGECU 55D that controls the PCU 50D; and a main electronic control unit (hereinafter referred to as a "main ECU") 170 that controls the engine 10D and the power transmission device 21. The engine 10D includes the upstream control apparatus 18 and the downstream control apparatus 19 as exhaust gas control apparatuses, and a crankshaft of the engine 10D is coupled to an input member of the damper mechanism 24. The motor generator MG operates as an electric motor that is driven with electricity from the electricity storage device 40D and generates a driving torque, and outputs a regenerative braking torque to brake the hybrid vehicle 1D. The motor generator MG operates also as a power generator that converts at least part of power from the engine 10D in load operation into electricity. A rotor of the motor generator MG is fixed to an input shaft 21$i$ of the power transmission device 21 as shown in FIG. 11.

The clutch K0 couples and uncouples an output member of the damper mechanism 24, i.e., the crankshaft of the engine 10D and the input shaft 21$i$, i.e., the rotor of the motor generator MG to and from each other. The power transmission device 21 includes a torque converter (fluid transmission device) 22, a multi- or single-disc lock-up clutch 23, a mechanical oil pump MOP, an electrically powered oil pump EOP, a transmission 25, and a hydraulic control device 27 that regulates the pressure of a working fluid. The transmission 25 is, for example, a four- to ten-speed automatic transmission, and includes a plurality of planetary gears, a plurality of clutches, and a plurality of brakes (frictional engaging elements). The transmission 25 changes the speed of power transmitted from the input shaft 21$i$ through either the torque converter 22 or the lock-up clutch 23 in multiple stages, and outputs this power from an output shaft 210 of the power transmission device 21 to the drive shaft DS through the differential gear 39. Alternatively, the transmission 25 may be a mechanical continuously variable transmission, a dual-clutch transmission, or the like. A clutch that couples and uncouples the rotor of the motor generator MG and the input shaft 21$i$ of the power transmission device 21 to and from each other may be disposed between the two (see the long dashed double-short dashed line in FIG. 11).

In the hybrid vehicle 1D, the same catalyst temperature raising control routine as that shown in FIG. 4 and FIG. 5 is executed by the main ECU 170 while the crankshaft of the engine 10D and the input shaft 21$i$, i.e., the motor generator MG are coupled together by the clutch K0 and load operation of the engine 10D is performed according to a driver's pressing on the accelerator pedal. During execution of the catalyst temperature raising control routine, the main ECU 170 and the MGECU 55D control the motor generator MG so as to cover a driving torque shortage resulting from fuel cutoff of some cylinders of the engine 10D. Thus, the hybrid vehicle 1D can achieve operational effects similar to those of the hybrid vehicle 1 etc. When the air-fuel ratio for the combustion cylinder is enriched in the hybrid vehicle 1D, excess power of the engine 10D may be converted into electricity by the motor generator MG, and an increase in the output torque of the engine 10D may be avoided by retarding the ignition timing. Further, in the hybrid vehicle 1D, the transmission 25 may be downshifted (the gear ratio may be changed) as necessary so as to set the speed of the engine 10D to or above a predetermined speed during execution of the catalyst temperature raising control routine.

Figure 12:
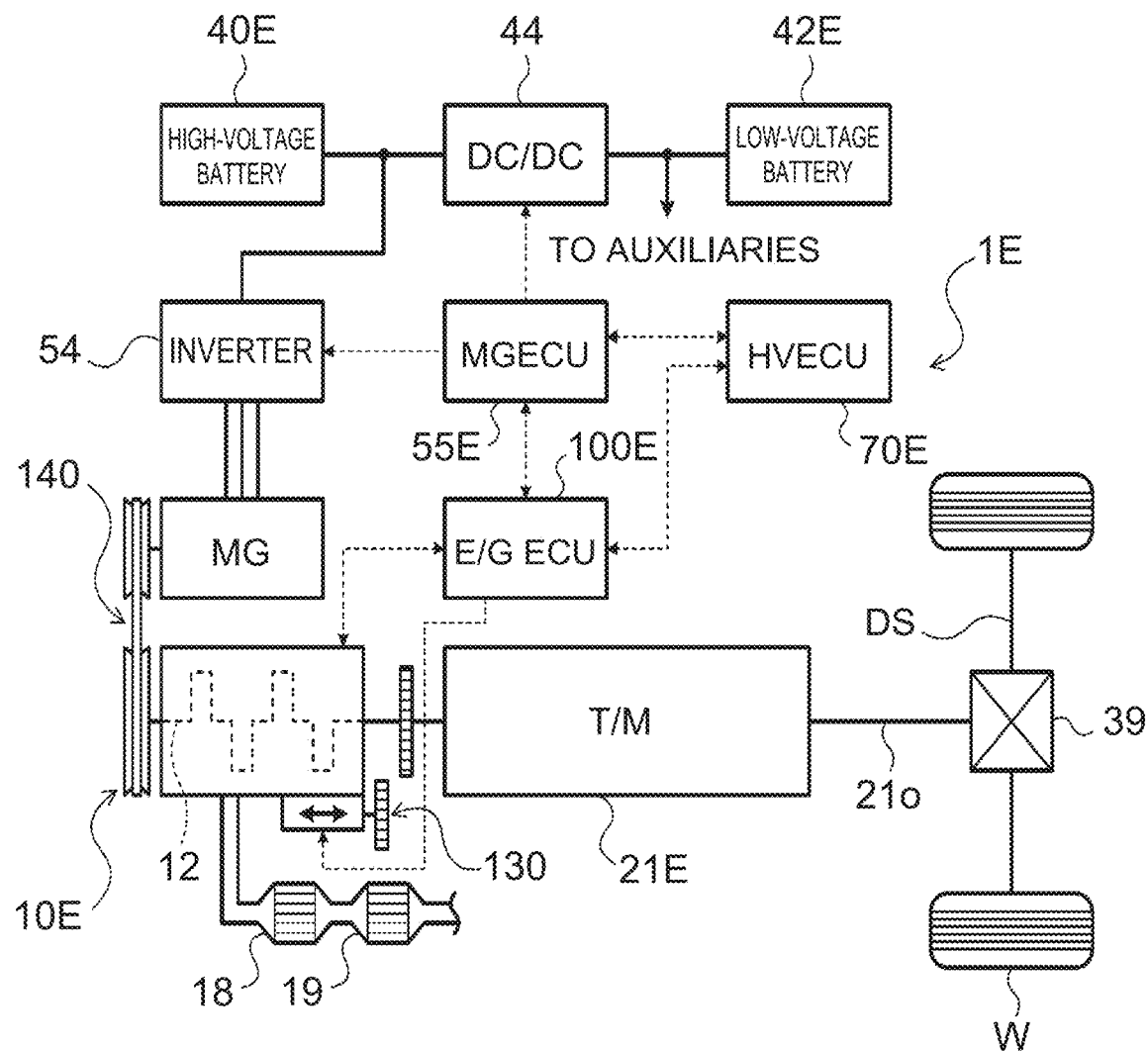
FIG. 12 is a schematic configuration diagram showing still another vehicle of this disclosure.

FIG. 12 is a schematic configuration diagram showing a hybrid vehicle 1E that is still another vehicle of this disclosure. Those components of the hybrid vehicle 1E that are the same as in the hybrid vehicle 1 etc. will be denoted by the same reference signs and an overlapping description will be omitted.

The hybrid vehicle 1E shown in FIG. 12 includes: an engine (internal combustion engine) 10E having a plurality of cylinders (not shown); the motor generator (synchronous motor-generator) MG; a power transmission device 21E; a high-voltage battery 40E; a low-voltage battery (auxiliary battery) 42E; a DC-DC converter 44 connected to the high-voltage battery 40E and the low-voltage battery 42E; an inverter 54 that drives the motor generator MG; an engine ECU 100E that controls the engine 10E; an MGECU 55E that controls the DC-DC converter 44 and the inverter 54; and an HVECU 70E that controls the entire vehicle. The engine 10E includes the upstream control apparatus 18 and the downstream control apparatus 19 as exhaust gas control apparatuses, and the crankshaft 12 of the engine 10E is coupled to an input member of a damper mechanism (not shown) included in the power transmission device 21E. The engine 10E further includes a starter 130 that outputs a cranking torque to the crankshaft 12 and starts the engine 10E.

The rotor of the motor generator MG is coupled to an end of the crankshaft 12 of the engine 10E on the opposite side from the power transmission device 21E through a transmission mechanism 140. In this embodiment, the transmission mechanism 140 is a wrapping transmission mechanism, a gear mechanism, or a chain mechanism. Alternatively, the motor generator MG may be disposed between the engine 10E and the power transmission device 21E, and may be a direct-current electric motor. The power transmission device 21E includes, in addition to the damper mechanism, a torque converter (fluid transmission device), a multi- or single-disc lock-up clutch, a transmission, and a hydraulic control device that regulates the pressure of a working fluid. The transmission of the power transmission device 21E is a stepped transmission, a mechanical continuously variable transmission, a dual-clutch transmission, or the like.

The hybrid vehicle 1E can start the engine 10E by outputting a cranking torque from the motor generator MG to the crankshaft 12 through the transmission mechanism 140. While the hybrid vehicle 1E is traveling, the motor generator MG operates mainly as a power generator that converts part of power from the engine 10E in load operation into electricity, and is driven with electricity from the high-voltage battery 40E as necessary to output a driving torque (assist torque) to the crankshaft 12 of the engine 10E. Further, the motor generator MG outputs a regenerative braking torque to the crankshaft 12 of the engine 10E to brake the hybrid vehicle 1E.

Also in the hybrid vehicle 1E, the same catalyst temperature raising control routine as that shown in FIG. 4 and FIG. 5 is executed by the engine ECU 100E while load operation of the engine 10E is performed according to a driver's pressing on the accelerator pedal. During execution of the catalyst temperature raising control routine, the HVECU 70E and the MGECU 55E control the motor generator MG so as to cover a driving torque shortage resulting from fuel cutoff of some cylinders of the engine 10E. Thus, the hybrid vehicle 1E can achieve operational effects similar to those of the hybrid vehicle 1 etc. When the air-fuel ratio for the combustion cylinder is enriched in the hybrid vehicle 1E, excess power of the engine 10E may be converted into electricity by the motor generator MG, and an increase in the output torque of the engine 10E may be avoided by retarding the ignition timing. Further, in the hybrid vehicle 1E, the transmission of the power transmission device 21E may be downshifted (the gear ratio may be changed) as necessary so as to set the speed of the engine 10E to or above a predetermined speed during execution of the catalyst temperature raising control routine.

Figure 13:
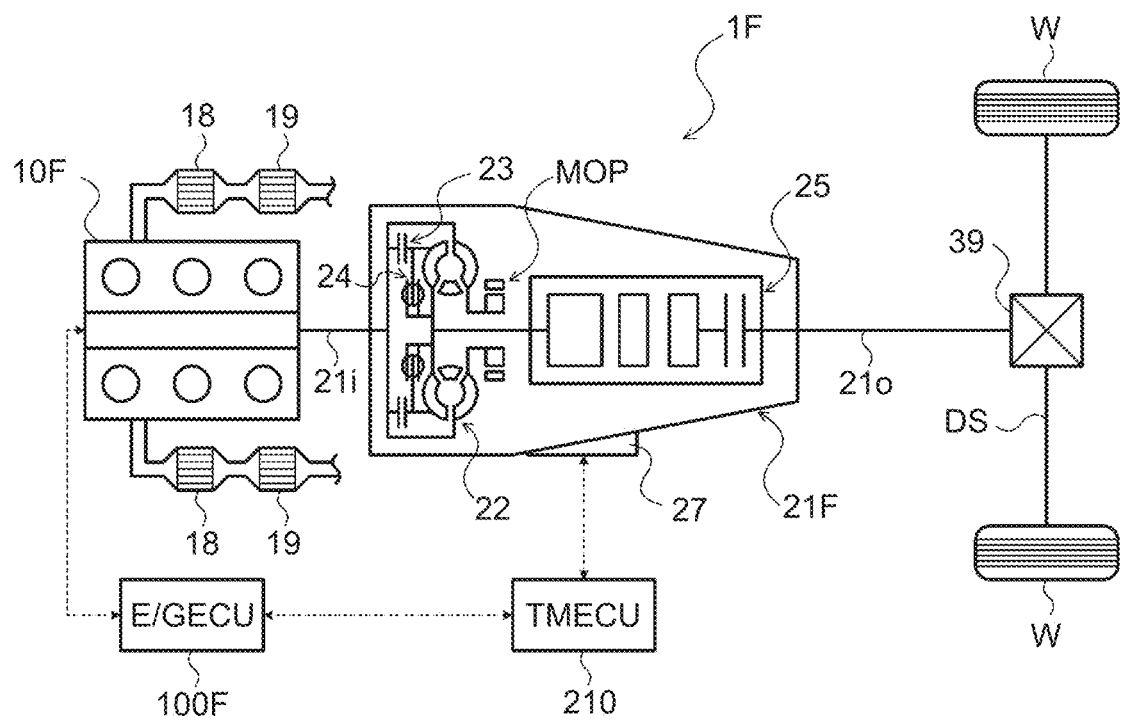
FIG. 13 is a schematic configuration diagram showing another vehicle of this disclosure.

FIG. 13 is a schematic configuration diagram showing a hybrid vehicle 1F that is another vehicle of this disclosure. Those components of the hybrid vehicle 1F that are the same as in the hybrid vehicle 1 etc. will be denoted by the same reference signs and an overlapping description will be omitted.

The vehicle 1F shown in FIG. 13 includes only an engine (internal combustion engine) 10F having a plurality of cylinders as a motive power generation source. The engine 10F of the vehicle 1F is, for example, a V-engine including the upstream control apparatus 18 and the downstream control apparatus 19 for each bank, and is controlled by an engine ECU 100F. Alternatively, the engine 10F may be an in-line engine, a horizontally opposed engine, or a W-engine. The vehicle 1F further includes a power transmission device 21F that is coupled to the engine 10F. The power transmission device 21F is controlled by a shift electronic control unit (hereinafter referred to as a "TMECU") 210 that exchanges information with the engine ECU 100F.

The power transmission device 21F includes the torque converter (fluid transmission device) 22, the multi- or single-disc lock-up clutch 23, the damper mechanism 24, the mechanical oil pump MOP, the electrically powered oil pump EOP, the transmission 25, and the hydraulic control device 27 that regulates the pressure of a working fluid. The transmission 25 is, for example, a four- to ten-speed automatic transmission, and includes a plurality of planetary gears, a plurality of clutches, and a plurality of brakes (frictional engaging elements). The transmission 25 changes the speed of power transmitted from the engine 10F through either the torque converter 22 or the lock-up clutch 23 in multiple stages, and outputs this power from the output shaft 210 of the power transmission device 21F to the drive shaft DS through the differential gear 39. Alternatively, the transmission 25 may be a mechanical continuously variable transmission, a dual-clutch transmission, or the like.

Figure 14:
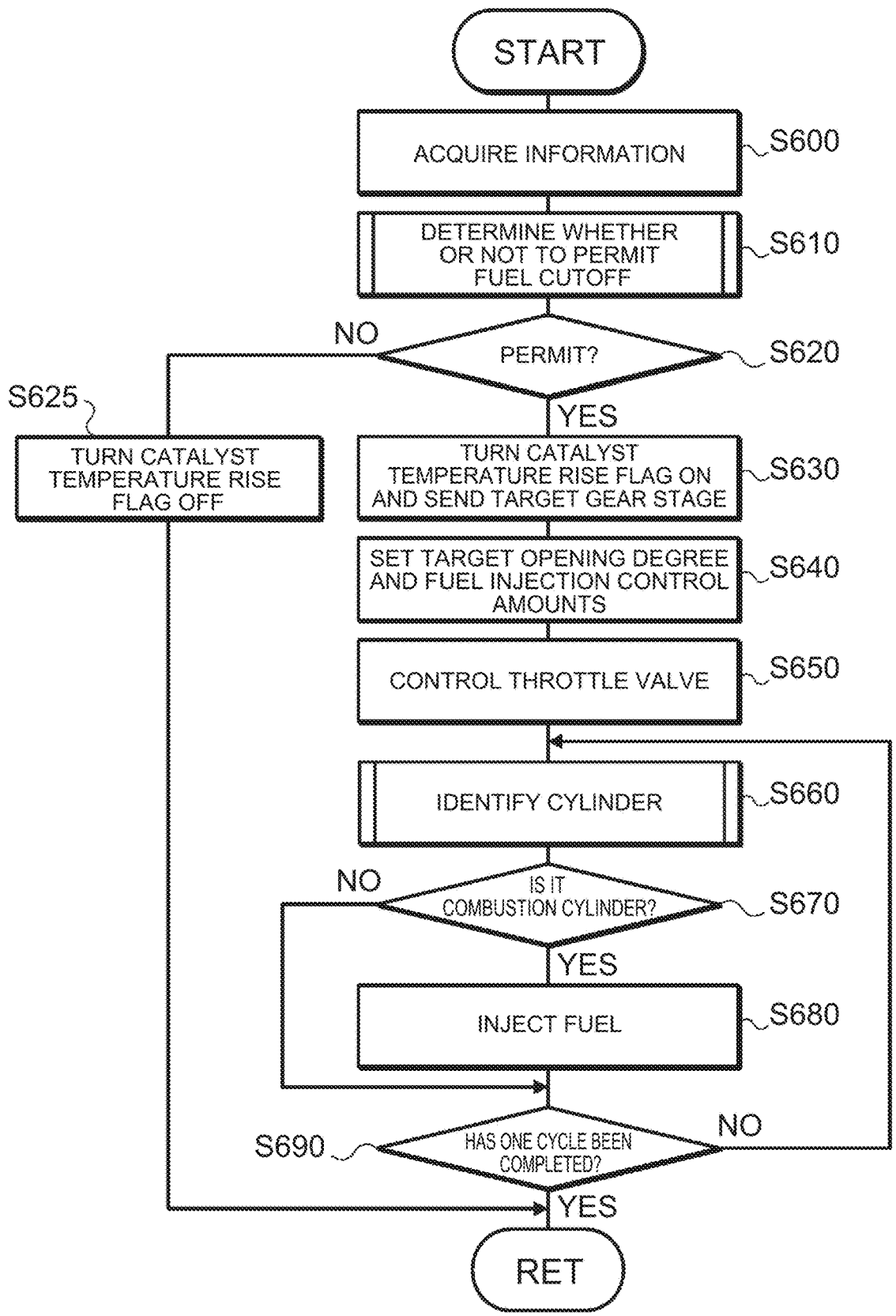
FIG. 14 is a flowchart illustrating a catalyst temperature raising control routine that is executed in the vehicle of FIG. 13.

FIG. 14 is a flowchart illustrating a catalyst temperature raising control routine that is executed by the engine ECU 100F in the vehicle 1F. The engine ECU 100F starts to execute the routine of FIG. 14 when it is determined that the build-up amount of particulate matter on the particulate filter of the downstream control apparatus 19 is equal to or larger than a threshold value, and that the temperature of the particulate filter is lower than a temperature raising control start temperature (predetermined temperature). At the start of the routine of FIG. 14, the engine ECU 100F acquires information required for the control, such as the required power Pe* and the target speed Ne* of the engine 10F that are separately set, the intake air amount GA, the speed Ne, and the coolant temperature Tw of the engine 10F, the crank position from the crank angle sensor 90, and the gear stage of the transmission 25 (step S600).

After the process of step S600, the engine ECU 100F determines whether or not to permit fuel cutoff of some of the cylinders 11 of the engine 10F (step S610). In step S610, the engine ECU 100F determines whether or not the speed Ne acquired in step S600 is equal to or higher than a predetermined speed (e.g., about 2500 rpm). When it is determined that the speed Ne is equal to or higher than the predetermined speed, the engine ECU 100F permits fuel cutoff of some cylinders 11. When the speed Ne of the engine 10F is lower than the predetermined speed, the engine ECU 100F determines whether or not the speed of the engine 10F can be set to or above the predetermined speed by downshifting the transmission 25 (changing the gear ratio) based on the speed Ne and the gear stage of the transmission 25. When it is determined that the speed of the engine 10F can be set to or above the predetermined speed by downshifting the transmission 25, the engine ECU 100F permits fuel cutoff of some cylinders. On the other hand, when it is determined that the speed of the engine 10F cannot be set to or above the predetermined speed by downshifting the transmission 25, the engine ECU 100F prohibits fuel cutoff of some cylinders.

When prohibiting fuel cutoff of some cylinders (step S620: NO), the engine ECU 100F turns the catalyst temperature rise flag off (step S625), and ends the routine of FIG. 14. On the other hand, when permitting fuel cutoff of some cylinders (step S620: YES), the engine ECU 100F turns the catalyst temperature rise flag on and sends a signal indicating a target gear stage that is a gear stage for setting the speed of the engine 10F to or above the predetermined speed to the TMECU 210 (step S630). The TMECU 210 controls the hydraulic control device 27 such that the gear stage of the transmission 25 meets the target gear stage from the engine ECU 100F.

Then, the engine ECU 100F sets fuel injection control amounts, such as a target opening degree of a throttle valve (not shown), an amount of fuel injected from a fuel injection valve (not shown) of the engine 10F, and a fuel injection end timing (step S640). In step S640, the engine ECU 100F sets, as the target opening degree of the throttle valve, an opening degree corresponding to the sum of a required torque (=Pe*/Ne*) and a value obtained by dividing this required torque by a value n·(n−1) (=Te*/n/(n−1), where n is the number of the cylinders of the engine 10F). In step S640, the engine ECU 100F sets the amount of fuel injected into one predetermined cylinder (fuel-cutoff cylinder) among the cylinders of the engine 10F to zero. Further, in step S640, the engine ECU 100F sets the amounts of fuel injected into the cylinders (combustion cylinders) other than the one cylinder based on the target opening degree of the throttle valve such that the air-fuel ratios for the other cylinders become the stoichiometric air-fuel ratio.

After the process of step S640, the engine ECU 100F controls a throttle motor of the throttle valve etc. such that the opening degree of the throttle valve meets the target opening degree (step S650). Further, the engine ECU 100F identifies a cylinder for which a fuel injection start timing has come based on the crank position from the crank angle sensor 90 (step S660). When it is determined, as a result of the identification process of step S660, that the fuel injection start timing for the one cylinder (fuel-cutoff cylinder) has come (step S670: NO), the engine ECU 100F does not inject fuel from the fuel injection valve corresponding this one cylinder, and determines whether or not one cycle of fuel injection for rotating the engine 10F twice has been completed (step S690). When it is determined, as a result of the identification process of step S660, that the fuel injection start timing for one of the other cylinders (combustion cylinders) has come (step S670: YES), the engine ECU 100F injects fuel from the fuel injection valve corresponding to this cylinder (step S680), and determines whether or not one cycle of fuel injection has been completed (step S690).

When it is determined in step S690 that one cycle of fuel injection has not yet been completed (step S690: NO), the engine ECU 100F repeatedly executes the processes of steps S660 to S680. When it is determined in step S690 that one cycle of fuel injection has been completed (step S690: YES), the engine ECU 100F re-executes the processes of step S600 and the subsequent steps. The routine of FIG. 14 is also executed while load operation of the engine 10F is performed according to a driver's pressing on the accelerator pedal, on the condition that fuel cutoff of some cylinders of the engine 10F is permitted in steps S610 and S620, until regeneration of the particulate filter of the downstream control apparatus 19 is completed.

As has been described above, in the vehicle 1F including only the engine 10F as a motive power generation source, the engine 10F is controlled during execution of the catalyst temperature raising control routine so as to cover a torque shortage (=Te*/n) resulting from fuel cutoff of some cylinders by combusting fuel in the cylinders (combustion cylinders) other than the fuel-cutoff cylinder. Specifically, the engine ECU 100F of the vehicle 1F increases the amount of air taken into and the amount of fuel injected into the other cylinders according to the torque shortage resulting from fuel cutoff of some cylinders (step S640 of FIG. 14). Thus, the torque shortage resulting from fuel cutoff of some cylinders can be reliably covered by combusting fuel in the other cylinders. Therefore, during load operation of the engine 10F, the vehicle 1F can also sufficiently raise the temperatures of the exhaust gas control catalyst of the upstream control apparatus 18 and the particulate filter of the downstream control apparatus 19 and supply a sufficient amount of oxygen to the upstream and downstream control apparatuses 18, 19, while avoiding deteriorating the drivability.

In the vehicle 1F, the transmission 25 is downshifted (the gear ratio is changed) as necessary so as to set the speed of the engine 10F to or above the predetermined speed during execution of the catalyst temperature raising control routine. Thus increasing the speed of the engine 10F can shorten the time during which fuel supply to some cylinders is stopped, so that problems such as vibration of the engine 10F can be highly reliably prevented from surfacing.

In the vehicle 1F, the fuel injection amounts may be set at the start of the catalyst temperature raising control routine such that the air-fuel ratio for the combustion cylinder becomes rich in step S640 of FIG. 14. Thus, the temperatures of the exhaust gas control catalyst and the particulate filter can be quickly raised. Also in the vehicle 1F, the number of fuel-cutoff cylinders may be increased or reduced according to the temperature of the particulate filter of the downstream control apparatus 19, as in the catalyst temperature raising control routine of FIG. 4 and FIG. 5. The processes of steps S620 to S630 may be omitted from the catalyst temperature raising control routine of FIG. 14. This means that, in the catalyst temperature raising control routine of FIG. 14, fuel cutoff of some cylinders may be permitted regardless of the traveling state of the vehicle 1F etc.

As has been described above, the vehicle according to a first aspect of this disclosure has a motive power generating device that includes a multi-cylinder engine and outputs driving power to a wheel, an exhaust gas control apparatus including a catalyst that removes harmful components of exhaust gas from the multi-cylinder engine, and a controller. The controller is configured to, upon request for raising the temperature of the catalyst during load operation of the multi-cylinder engine, execute catalyst temperature raising control that involves stopping fuel supply to at least one of cylinders and supplying fuel to the other cylinders than the at least one cylinder, and to control the motive power generating device so as to cover a driving power shortage resulting from execution of the catalyst temperature raising control.

The controller of the vehicle of this disclosure is configured to, upon request for raising the temperature of the catalyst during load operation of the multi-cylinder engine, execute the catalyst temperature raising control that involves stopping fuel supply to at least one of the cylinders of the multi-cylinder engine and supplying fuel to the other cylinders. Thus, during execution of the catalyst temperature raising control, air, i.e., oxygen is introduced into the exhaust gas control apparatus from the cylinder to which fuel supply is stopped, and uncombusted fuel is introduced into the exhaust gas control apparatus from the cylinder to which fuel is supplied. This makes it possible to cause the uncombusted fuel to react in the presence of sufficient oxygen and sufficiently raise the temperature of the catalyst with the heat of the reaction during load operation of the multi-cylinder engine. With stoppage of fuel supply to some cylinders continued, a sufficient amount of oxygen can be supplied into the exhaust gas control apparatus of which the temperature has been raised. Moreover, during execution of the catalyst temperature raising control, the motive power generating device is controlled by the controller so as to cover a driving power shortage resulting from execution of the catalyst temperature raising control, i.e., stoppage of fuel supply to the at least one cylinder. Thus, a driving force as required can be output to the wheels during execution of the catalyst temperature raising control. Therefore, during load operation of the multi-cylinder engine, the vehicle of this disclosure can sufficiently raise the temperature of the catalyst of the exhaust gas control apparatus and supply a sufficient amount of oxygen to the exhaust gas control apparatus while avoiding deteriorating the drivability.

In the above aspect, the motive power generating device may include the multi-cylinder engine and an electric motor as motive power generation sources, and the controller may be configured to control the electric motor so as to cover the driving power shortage. Thus, the driving power shortage resulting from stoppage of fuel supply to some cylinders can be covered by the electric motor with high accuracy and responsiveness.

In the above aspect, the controller may be configured to control the electric motor so as to cover the driving power shortage while fuel supply to the at least one cylinder is stopped. Thus, deterioration in the drivability of the vehicle can be highly reliably avoided during execution of the catalyst temperature raising control.

In the above aspect, the controller may be configured to set a lower limit value of the speed of the multi-cylinder engine to be higher when the catalyst temperature raising control is being executed than when the catalyst temperature raising control is not being executed. This can shorten the time during which fuel supply to some cylinders is stopped, i.e., the time during which no power (torque) is output from the multi-cylinder engine. Therefore, problems due to stoppage of fuel supply to some cylinders such as vibration of the multi-cylinder engine can be highly reliably prevented from surfacing.

In the above aspect, the motive power generating device may include only the multi-cylinder engine as a motive power generation source, and the controller may be configured to control the multi-cylinder engine during execution of the catalyst temperature raising control so as to cover the driving power shortage by combusting fuel in the other cylinders. Thus, a vehicle including only a multi-cylinder engine as a motive power generation source can, during load operation of the multi-cylinder engine, sufficiently raise the temperature of the catalyst and supply a sufficient amount of oxygen to the exhaust gas control apparatus while avoiding deteriorating the drivability.

In the above aspect, the controller may be configured to increase the amount of air taken into and the amount of fuel supplied to the other cylinders according to the driving power shortage. Thus, the driving power shortage resulting from stoppage of fuel supply to some cylinders can be reliably covered by combusting fuel in the other cylinders. In this case, enriching the air-fuel ratios for the other cylinders can further promote the temperature rise of the catalyst.

In the above aspect, the controller may be configured to set the speed of the multi-cylinder engine to or above a predetermined speed during execution of the catalyst temperature raising control. This can shorten the time during which fuel supply is stopped, i.e., the time during which no power (torque) is output from the multi-cylinder engine. Therefore, problems due to stoppage of fuel supply to some cylinders such as vibration of the multi-cylinder engine can be highly reliably prevented from surfacing.

In the above aspect, the multi-cylinder engine may be an in-line engine, and the controller may be configured to stop fuel supply to at least one of the cylinders during one cycle while the catalyst temperature raising control is executed. Thus, sufficient oxygen can be sent to the exhaust gas control apparatus.

In the above aspect, the multi-cylinder engine may be a V-engine, a horizontally opposed engine, or a W-engine. Each of banks of the multi-cylinder engine may be provided with the exhaust gas control apparatus. The controller may be configured to stop fuel supply to at least one of the cylinders in each of the banks during one cycle while the catalyst temperature raising control is executed. Thus, sufficient oxygen can be sent to the exhaust gas control apparatus in each of the banks of the V-engine etc.

In the above aspect, the exhaust gas control apparatus may include a particulate filter. In a vehicle including such an exhaust gas control apparatus, a large amount of oxygen can be introduced from a cylinder to which fuel supply is stopped into the particulate filter of which the temperature has been raised along with the temperature of the catalyst, and particulate matter having built up on the particulate filter can be reliably combusted. Thus, the catalyst temperature raising control of this disclosure is extremely effective for regenerating a particulate filter in a low-temperature environment where a large amount of particulate matter tends to build up on the particulate filter. The particulate filter may be disposed downstream of the catalyst and support a catalyst. The exhaust gas control apparatus may include an upstream control apparatus that includes a catalyst, and a downstream control apparatus that includes at least a particulate filter and is disposed downstream of the upstream control apparatus.

In the control method of a vehicle according to a second aspect of this disclosure, the vehicle includes a motive power generating device that includes a multi-cylinder engine and outputs driving power to a wheel, and an exhaust gas control apparatus including a catalyst that removes harmful components of exhaust gas from the multi-cylinder engine. This method includes, upon request for raising the temperature of the catalyst during load operation of the multi-cylinder engine, executing catalyst temperature raising control that involves stopping fuel supply to at least one of cylinders and supplying fuel to the other cylinders than the at least one cylinder, and controlling the motive power generating device so as to cover a driving power shortage resulting from execution of the catalyst temperature raising control.

During load operation of the multi-cylinder engine, the control method having this aspect can sufficiently raise the temperature of the catalyst of the exhaust gas control apparatus and supply a sufficient amount of oxygen to the exhaust gas control apparatus while avoiding deteriorating the drivability.

It should be understood that the this disclosure is in no way limited by the above embodiment but can be changed in various ways within the extensive scope of the disclosure. The above embodiment is merely one specific form of the disclosure described in the section SUMMARY, and is not intended to limit the elements of the disclosure described in that section.

The disclosure can be applied to the vehicle manufacturing industry and the like.

What is claimed is:

1. A vehicle comprising:
    a motive power generating device that includes a multi-cylinder engine and outputs driving power to a wheel;
    an exhaust gas control apparatus including a catalyst that removes harmful components of exhaust gas from the multi-cylinder engine; and
    a controller, wherein
    the controller is configured to, upon request for raising a temperature of the catalyst during load operation of the multi-cylinder engine, execute catalyst temperature raising control that involves stopping fuel supply to at least one of cylinders and supplying fuel to the other cylinders than the at least one cylinder, and to control the motive power generating device so as to cover a driving power shortage resulting from execution of the catalyst temperature raising control.

2. The vehicle according to claim 1, wherein:
    the motive power generating device includes the multi-cylinder engine and an electric motor as motive power generation sources; and
    the controller is configured to control the electric motor so as to cover the driving power shortage.

3. The vehicle according to claim 2, wherein the controller is configured to control the electric motor so as to cover the driving power shortage while fuel supply to the at least one cylinder is stopped.

4. The vehicle according to claim 2, wherein the controller is configured to set a lower limit value of a speed of the multi-cylinder engine to be higher when the catalyst temperature raising control is being executed than when the catalyst temperature raising control is not being executed.

5. The vehicle according to claim 1, wherein:
the motive power generating device includes only the multi-cylinder engine as a motive power generation source; and
the controller is configured to control the multi-cylinder engine during execution of the catalyst temperature raising control so as to cover the driving power shortage by combusting fuel in the other cylinders.

6. The vehicle according to claim 5, wherein the controller is configured to increase an amount of air taken into and an amount of fuel supplied to the other cylinders according to the driving power shortage.

7. The vehicle according to claim 5, wherein the controller is configured to set a speed of the multi-cylinder engine to or above a predetermined speed during execution of the catalyst temperature raising control.

8. The vehicle according to claim 1, wherein:
the multi-cylinder engine is an in-line engine; and
the controller is configured to stop fuel supply to at least one of the cylinders during one cycle while the catalyst temperature raising control is executed.

9. The vehicle according to claim 1, wherein:
the multi-cylinder engine is a V-engine, a horizontally opposed engine, or a W-engine;
each of banks of the multi-cylinder engine is provided with the exhaust gas control apparatus; and
the controller is configured to stop fuel supply to at least one of the cylinders in each of the banks during one cycle while the catalyst temperature raising control is executed.

10. The vehicle according to claim 1, wherein the exhaust gas control apparatus includes a particulate filter.

11. A control method of a vehicle, the vehicle including a motive power generating device that includes a multi-cylinder engine and outputs driving power to a wheel, and an exhaust gas control apparatus including a catalyst that removes harmful components of exhaust gas from the multi-cylinder engine, the method comprising, upon request for raising a temperature of the catalyst during load operation of the multi-cylinder engine, executing catalyst temperature raising control that involves stopping fuel supply to at least one of cylinders and supplying fuel to the other cylinders than the at least one cylinder, and controlling the motive power generating device so as to cover a driving power shortage resulting from execution of the catalyst temperature raising control.

* * * * *